United States Patent [19]
Oshida et al.

[11] Patent Number: 5,585,204
[45] Date of Patent: Dec. 17, 1996

[54] TEMPERATURE CONTROL STRUCTURE FOR BATTERIES AND BATTERY BOX FOR HOUSING SUCH BATTERIES

[75] Inventors: Kei Oshida; Syuichiro Iwatsuki, both of Wako, Japan

[73] Assignee: Honda Giken Kogyo Kabushiki Kaisha, Tokyo, Japan

[21] Appl. No.: 364,548

[22] Filed: Dec. 27, 1994

[30] Foreign Application Priority Data

Dec. 27, 1993 [JP] Japan ..................................... 5-348395
Sep. 21, 1994 [JP] Japan ..................................... 6-226286

[51] Int. Cl.⁶ .................................................. H01M 10/50
[52] U.S. Cl. ............................ 429/62; 429/120; 429/148
[58] Field of Search ............................ 429/62, 120, 148; 204/262, 274; 29/889.4

[56] References Cited

U.S. PATENT DOCUMENTS 3,358,912 12/1967 Beesley .
3,358,913 12/1967 Beesley .
3,745,048 7/1973 Dinkler et al. ........................... 429/120
3,767,458 10/1973 Schusler ............................... 429/120 X
4,169,918 10/1979 Moore .................................. 429/120 X
5,432,026 7/1995 Sahm et al. ............................. 429/120
5,456,999 10/1995 Mita ..................................... 429/148 X

FOREIGN PATENT DOCUMENTS 5169981 7/1993 Japan .

OTHER PUBLICATIONS

English language Abstract of JP 5–169981 (Jul. 1993).

Primary Examiner—Stephen Kalafut
Attorney, Agent, or Firm—Lyon & Lyon

[57] ABSTRACT

To minimize temperature differences between batteries and also between battery cells for effectively cooling the batteries uniformly, a fan structure is disposed on one side of a box assembly of a battery box and four of six surfaces of each of the batteries which are box-shaped are covered with thermally insulating members. When a motor of the fan structure is energized, the fan structure introduces cooling air forcibly into the box assembly to cool the two exposed surfaces of each of the batteries. The battery box with the fan structure is relatively simple in structure, lightweight, economical, and can easily be inspected and serviced for maintenance.

35 Claims, 23 Drawing Sheets

TEMPERATURE CONTROL STRUCTURE FOR BATTERIES AND BATTERY BOX FOR HOUSING SUCH BATTERIES

BACKGROUND OF THE INVENTION

1. Field of the Invention

The present invention relates to a temperature control structure for batteries and a battery box for housing such batteries, and more particularly to a temperature control structure for uniformly and effectively controlling the temperatures of respective batteries which are housed in arrays in a battery box, and a battery box for housing such batteries.

2. Description of the Related Art

It has heretofore been confirmed that the performance of batteries varies depending on the temperature of the batteries. For example, the mileage and durability of batteries mounted on an electric vehicle vary depending on the temperature of the batteries. It is therefore desirable for the batteries on such an electric vehicle to be used in a predetermined temperature range in order to maintain their mileage and prevent their durability from being reduced.

There has been proposed an apparatus for cooling batteries for use on an electric vehicle as disclosed in Japanese laid-open patent publication No. 5-169981. In the disclose cooling apparatus, a total of twenty batteries arranged in rows and columns are housed in a battery box, and air introduced from a front wall of the battery box is guided to flow backward through the battery box to cool the batteries placed in the battery box. The air is caused to flow backward through the battery box by air discharge fans that are mounted on a rear wall of the battery box.

A conventional battery box and a cooling apparatus thereof, which is operated on the same principle as that of the proposed cooling apparatus, will be described below with reference to FIGS. 1 and 2 of the accompanying drawings.

FIG. 1 shows in schematic plan the positional relationship between a battery box, batteries housed therein, and cooling fans for cooling the batteries. FIG. 2 shows in schematic vertical cross section the battery box, the batteries, and the cooling fans which are illustrated in FIG. 1. As shown in FIG. 1, three fans 4a–4c are mounted on a front wall of a battery box 2 for forcing cooling air into the battery box 2, and two air discharging fans 6a, 6b are mounted on a rear wall of the battery box 2 for drawing air out of the battery box 2. A total of twenty batteries 8 arranged in four rows and five columns are housed in the battery box 2.

When the fans 4a–4c and the air discharging fans 6a, 6b are operated, cooling air introduced into the battery box 2 by the fans 4a–4c flows backward along the batteries 8 as indicated by the arrows, and is finally discharged out of the battery box 2 by the air discharging fans 6a, 6b. While flowing in the battery box 2, the cooling air can cool the front surface, two side surfaces, and rear surface of each of the batteries 8.

FIG. 3 of the accompanying drawings illustrates the temperature of the cooling air as it flows in the battery box 2. As the cooling air flows to the right in the battery box 2, the temperature of the cooling air gradually rises by absorbing heat from the batteries 8 which the cooling air has contacted, and hence the ability of the cooling air to cool the batteries 8 is gradually lowered. Consequently, the batteries 8 are subject to various temperatures which differ in the downstream direction of the air flow.

FIG. 4 of the accompanying drawings shows some of the batteries 8 in fragmentary plan. Each of the batteries 8 comprises an array of six cells 8a. Since each battery 8 is cooled at its front surface, two side surfaces, and rear surface, the first and sixth cells 8a are cooled more strongly than the other cells 8a positioned therebetween because the first and sixth cells 8a have much more surface area for contact with the cooling air than the other cells 8a.

With the above cooling apparatus, therefore, the batteries suffer large temperature differences, and the cells in each of the batteries also suffer large temperature differences.

The large temperature differences between the batteries result in different battery charging efficiencies, which allow overly charged and insufficiently charged batteries to exist at the same time in the battery box. When those batteries are repeatedly charged and discharged, therefore, some batteries or cells end their service life more quickly than the others. Since the batteries are used and replaced as a set, the service life of the set of batteries tends to become far shorter than an expected period of time.

If the temperature of some batteries or cells is lower than a given temperature of 15° C., for example, then their chargeableness and dischargeableness are lowered. Stated otherwise, a battery cannot perform its desired functions at temperatures lower than a predetermined temperature. Batteries whose bottoms are held in contact with a battery case allowing the heat of the batteries to be radiated outwardly through the battery case may not stand practical use in winter or cold climates where the temperature around the batteries is low.

The fans 4a–4c and the air discharging fans 6a, 6b which are associated with the battery box 2 as shown in FIGS. 1 and 2 are usually combined with respective electric motors for rotating the fans. Accordingly, the conventional battery temperature control structure is relatively expensive to manufacture and heavy.

The electric motors for rotating the fans are required to be connected to respective on/off switches and respective fuses. Consequently, a complex electric circuit is required to control the electric motors, resulting in a further increase in the cost of the conventional battery temperature control structure.

SUMMARY OF THE INVENTION

It is an object of the present invention to provide a temperature controlsstructure which is able to control the temperature of batteries to an appropriate temperature, and a battery box for housing the batteries.

Another object of the present invention is to provide a temperature control structure which will minimize temperature differences between batteries, and a battery box for housing the batteries.

Still another object of the present invention is to provide a temperature control structure which will minimize temperature differences between cells in each of the batteries, and a battery box for housing the batteries.

Yet still another object of the present invention is to provide a temperature control structure which can effectively cool batteries without inducing temperature differences between the batteries, has a reduced weight, can be manufactured less costly, and can easily be inspected and serviced, and a battery box for housing the batteries.

To achieve the above objects, there is provided in accordance with the present invention a temperature control structure for controlling the temperatures of batteries, comprising a casing, a plurality of batteries housed in the casing, each of the batteries being of a box shape having six surfaces, thermally insulating members covering four out of the six surfaces of each of the batteries, air passages defined in the casing, the remaining two surfaces of each of the batteries being exposed to the air passages, and means for forcibly applying cooling air through the air passages to the two surfaces of each of the batteries.

Each the batteries is in the form of a rectangular parallelepiped, the two surfaces comprising wider side surfaces of each of the batteries.

According to the present invention, there is also provide a battery box comprising a casing, at least one box-shaped battery housed in the casing, air passages defined in the casing along side surfaces of the battery, and thermally insulating members disposed in the casing out of the air passages in covering relation to surfaces of the battery other than the side surfaces.

The box-shaped battery is elongate and two of the surfaces extend perpendicularly to a longitudinal direction of the battery, and wherein one of the thermally insulating members disposed in covering relation to the two surfaces is spaced from a side wall of the casing, thereby defining an air discharge passage between the side wall of the casing and the one of the thermally insulating members.

According to the present invention, there is further provide a battery box comprising a casing, and a plurality of box-shaped batteries housed in the casing, the casing including a bottom plate having a plurality of slits defined therein for applying cooling air introduced therethrough to side surfaces of the box-shaped batteries.

Each of the batteries is in the form of a rectangular parallelepiped, the slits being open toward wider side surfaces of the batteries.

The battery box further comprises an array of runners disposed on one side of the casing, coupling means for coaxially coupling the runners with each other, and a single rotary actuator coupled to one of the runners for rotating the runners in unison with each other.

The single rotary actuator is coupled to one of the runners at one end of the array.

The array of runners comprises three runners coaxially coupled to each other by the coupling means.

The coupling means comprises a plurality of bushings mounted on the runners, a plurality of joints fitted respectively in the bushings, and a plurality of drive shafts each fitted in the joints in the bushings which are mounted on adjacent two of the runners.

According to the present invention, there is also provided a temperature control structure for controlling the temperatures of batteries for propelling an electric vehicle, comprising a casing having a bottom plate, a plurality of batteries housed in the casing, each of the batteries being of a box shape having six surfaces, and at least one air duct mounted on a lower surface of the bottom plate of the casing for applying cooling air to wider side surfaces of the six surfaces of each of the batteries.

The temperature control structure further comprises a support mounted on the casing and supporting at least the bottom plate of the casing, the support having a hollow structure serving as a duct for applying cooling air to the side surfaces of each of the batteries.

The support has a lower surface which is lower than a lower surface of the air duct.

A plurality of parallel air ducts are mounted on the lower surface of the casing and mechanically coupled to each other.

Each of the air ducts is integrally molded of synthetic resin.

Each of the air ducts has at least one notch defined therein for allowing the air duct to be deformed when subjected to external forces.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
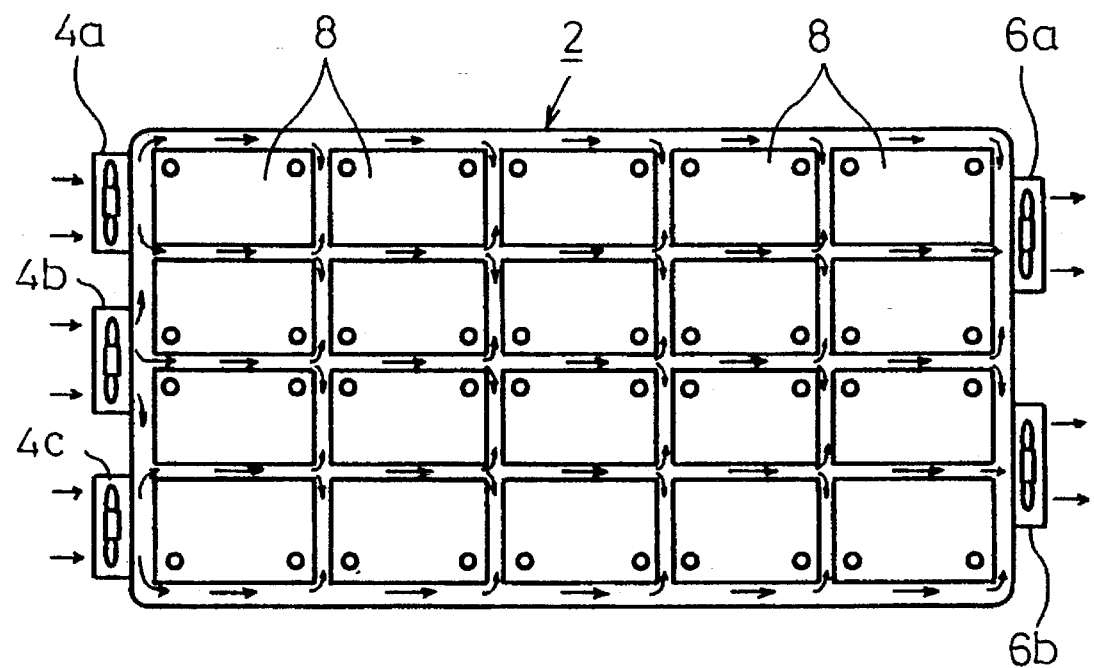
FIG. 1 is a schematic plan view showing the positional relationship between a conventional battery box, batteries housed therein, and cooling fans for cooling the batteries.
Figure 2:
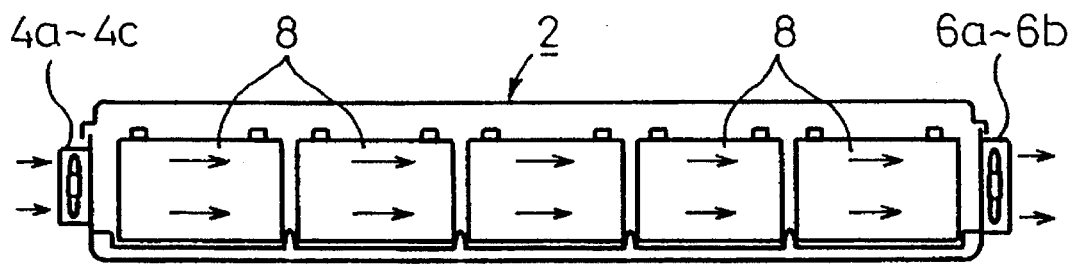
FIG. 2 is a schematic vertical cross-sectional view of the battery box, the batteries, and the cooling fans shown in FIG. 1.
Figure 3:
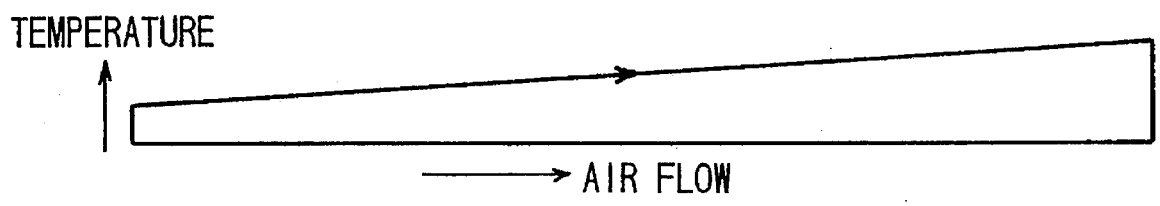
FIG. 3 is a diagram showing a temperature characteristic curve of cooling air in the conventional battery box.
Figure 4:
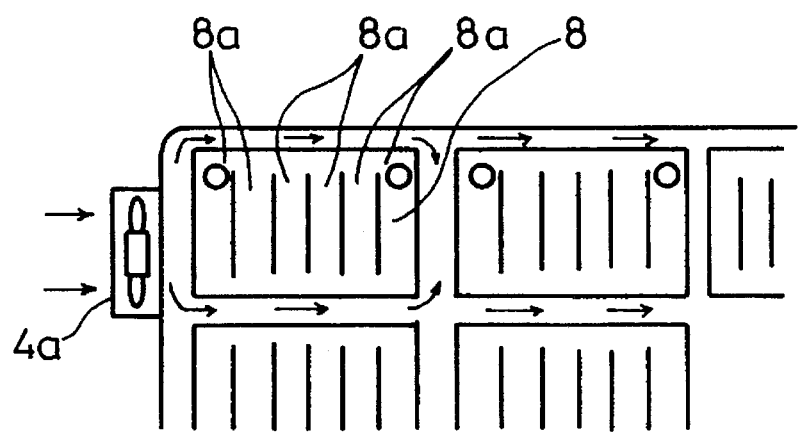
FIG. 4 is an enlarged fragmentary plan view of the batteries in the conventional battery box.
Figure 5:
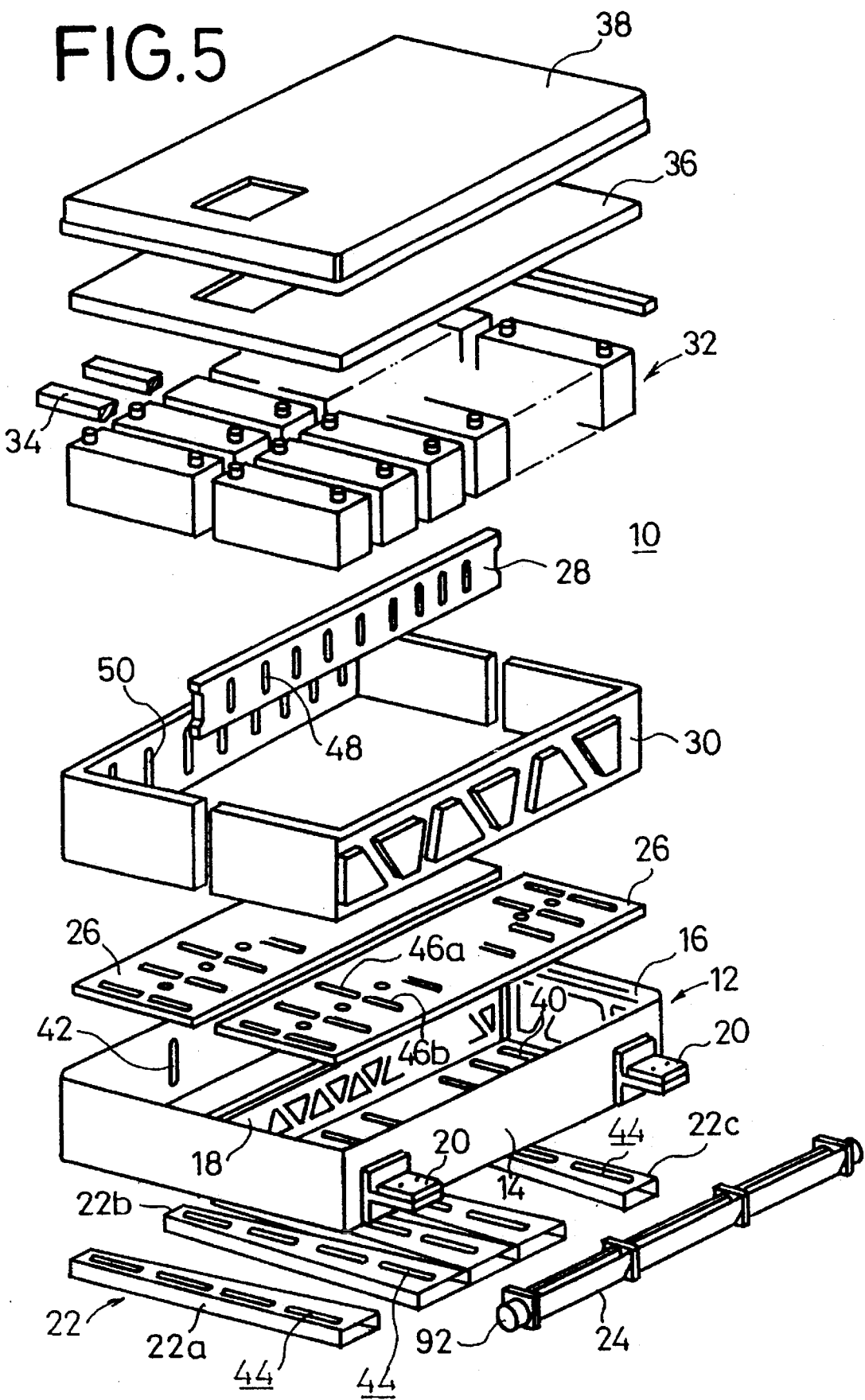
FIG. 5 is an exploded perspective view of a battery box according to an embodiment of the present invention.

As shown in FIG. 5, a battery box 10 according to an embodiment of the present invention, which incorporates a battery temperature control structure, includes a bottomed box assembly or casing 12 which basically comprises an outer box 14, an inner frame 16 fixed to inner surfaces of four side walls of the outer box 14, a center frame 18 disposed longitudinally centrally in the inner frame 16, and support frames 20 for supporting the outer box 14. The battery box 10 also includes an air duct assembly 22 attached to a bottom plate of the box assembly 12. The air duct assembly 22 comprises a plurality of parallel air ducts 22a, 22b, 22c, a fan structure 24 positioned at ends of the air ducts 22a, 22b, 22c for supplying air under pressure into the air ducts 22a, 22b, 22c from one end thereof, and a pair of lower thermally insulating members 26 placed on the bottom plate of the box assembly 12. Each of the air ducts 22a, 22b, 22c is of a hollow rectangular cross section, and has an air inlet end opening toward the fan structure 24. Each of the air ducts 22a, 22b, 22c is of a triangular shape progressively tapered toward an opposite end thereof which is closed. When the impellers, fans or runners (herein referred to as "runners") of the fan structure 24 are rotated, cooling air is supplied therefrom into the hollow air ducts 22a, 22b, 22c, from which the cooling air is introduced through slits 44 defined in the air ducts 22a, 22b, 22c into the box assembly 12. Actually, there are one air duct 22a, one air duct 22c, and eleven air ducts 22b which are positioned between the air ducts 22a, 22c.

The battery box 10 also has a central thermally insulating member 28 filled in a central hollow region of the center frame 18, a side thermally insulating member 30 associated with the inner frame 16, a total of 24 batteries 32 housed in the box assembly 12, a plurality of seal members 34 closing upper gaps between the batteries 32, an upper thermally insulating member 36 placed over the batteries 32, and a lid 38 disposed over the upper thermally insulating member 36. Details of the fan structure 24 will be described later on.

The bottom plate of the box assembly 12 has a plurality of parallel air inlet slits 40 defined therein in registry with gaps between the longitudinal side surfaces, i.e., wider surfaces, of each adjacent pair of batteries 32. The slits 44 defined in the air ducts 22a, 22b, 22c extend parallel to each other in registry with the air inlet slits 40. The box assembly 12 has three vertical oblong air discharge slots 42 defined in a side panel thereof which is positioned remotest from the fan structure 24. The lower thermally insulating members 26 have oblong slits 46a, 46b defined therein also in registry with the slits 44.

Figure 6:
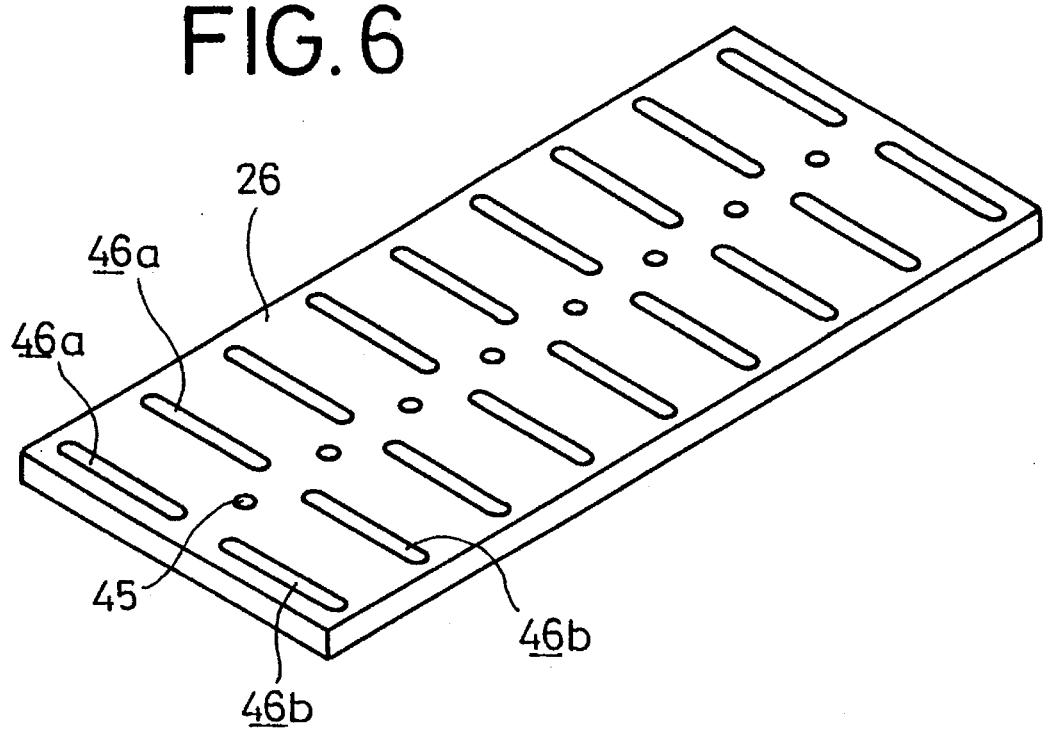
FIG. 6 is a perspective view of a lower thermally insulating member in the battery box according to the embodiment of the present invention.
Figure 7:
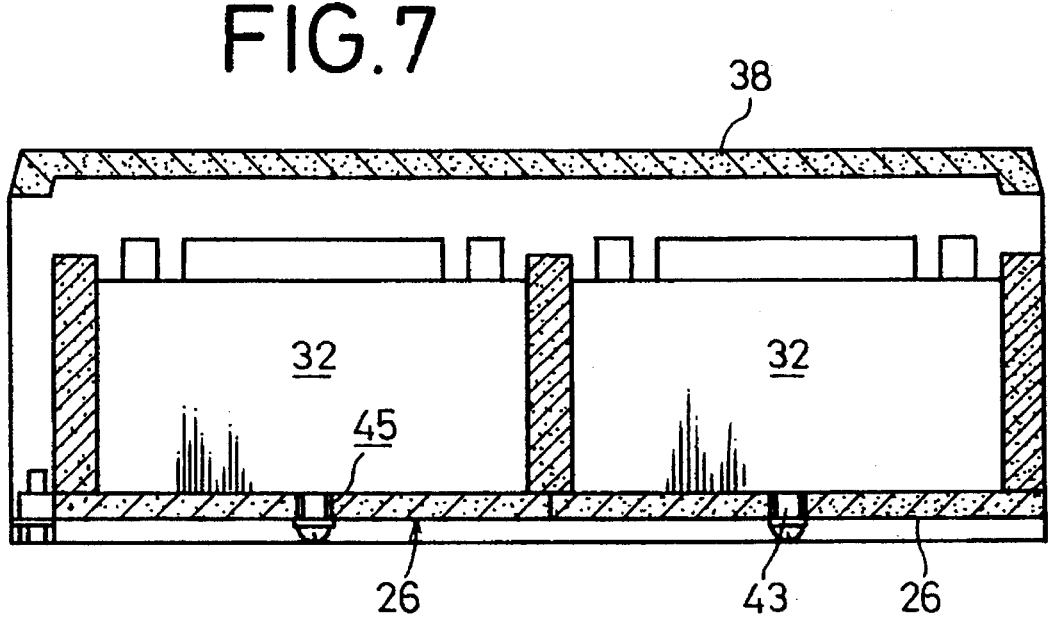
FIG. 7 is a vertical cross-sectional view showing the manner in which lower thermally insulating members, air ducts, and batteries are joined to each other.

As shown in FIG. 6, each of the lower thermally insulating members 26 has a plurality of holes 45 defined therein between the groups of slits 46a, 46b for insertion of clips 43 (see FIG. 7) to couple the air ducts 22a, 22b, 22c integrally with the lower thermally insulating member 26. When the clips 43 are inserted into the holes 45, the air ducts 22a, 22b, 22c are coupled integrally with the bottom of battery box 12 without imposing undue stresses to the lower thermally insulating members 26 (see FIG. 7).

The central thermally insulating member 28 also has a plurality of vertical slits 48 defined therein in alignment with the air inlet slits 40 in the bottom plate of the box assembly 12. The side thermally insulating member 30 also has a plurality of parallel slits 50 defined therein.

Figure 8:
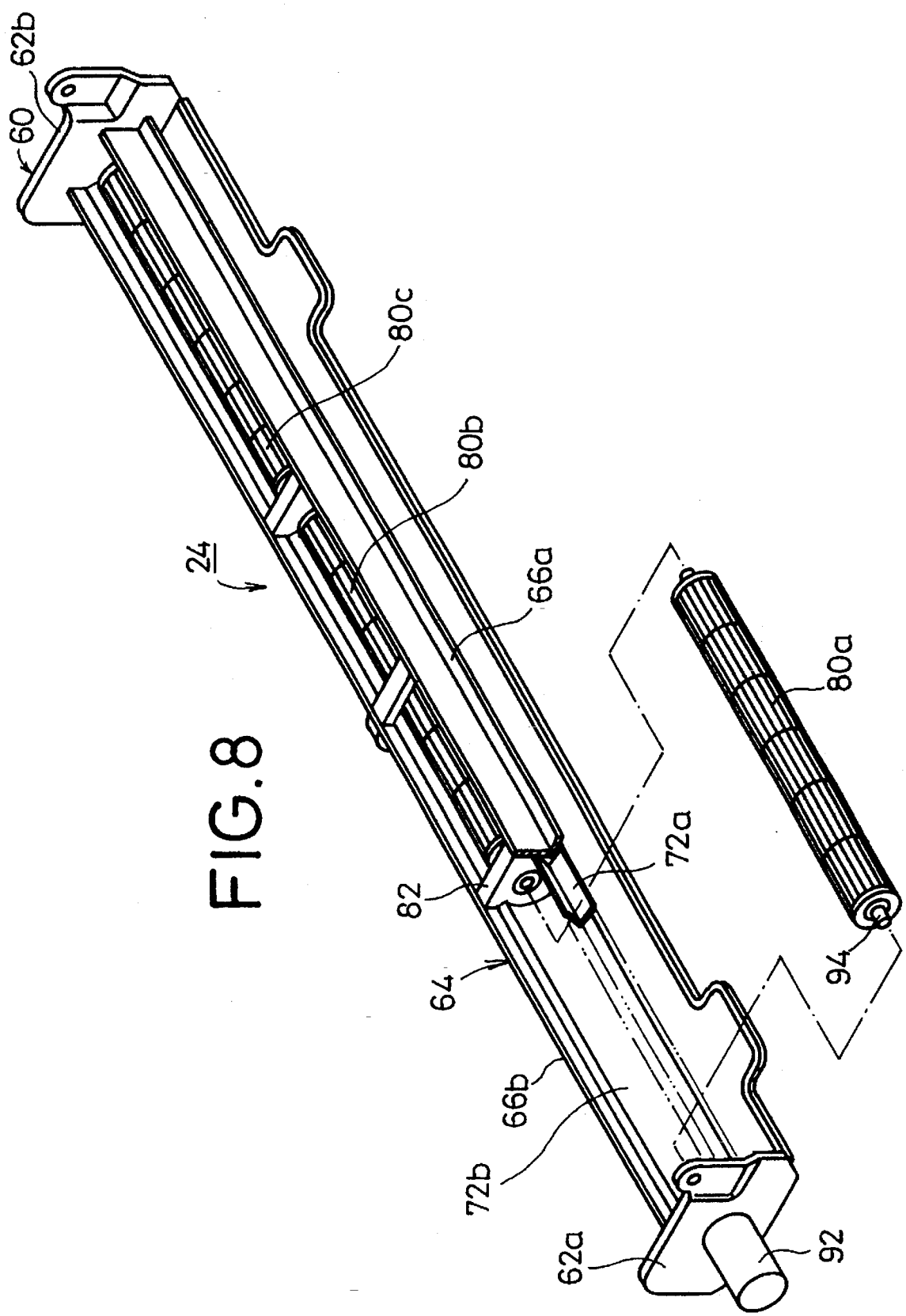
FIG. 8 is a perspective view showing the manner in which runners of a fan structure and a rotary actuator are coupled to each other according to an embodiment of the present invention.
Figure 9:
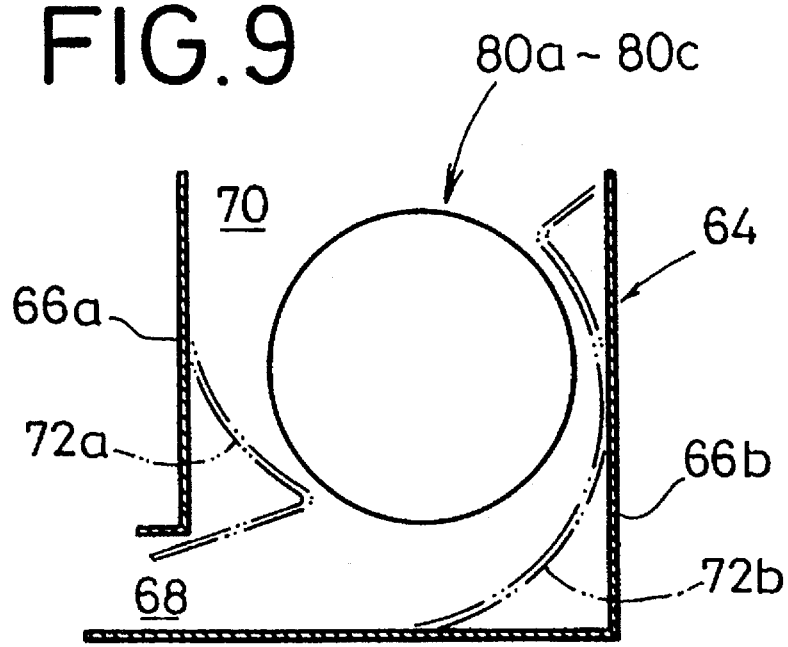
FIG. 9 is a vertical cross-sectional view showing the relationship between a runner and a cooling air inlet.

FIG. 8 shows the fan structure 24 in exploded perspective, illustrating how runners 80a, 80b, 80c and a motor 92 thereof are coupled to each other. As shown in FIG. 8, the fan structure 24 includes a casing 60 having a pair of side walls 62a, 62b spaced from each other and a bridge member 64 extending between the side walls 62a, 26b, the bridge member 64 doubling as a duct. As shown in FIGS. 8 and 9, the bridge member 64 comprises a first bent plate 66a and a second belt plate 66b which have respective horizontal bent ends extending toward the air ducts 22a, 22b, 22c. Specifically, the first and second bent plates 66a, 66b have respective horizontal bent ends jointly defining a cooling air outlet 68 therebetween which faces the air ducts 22a, 22b, 22c.

The first and second bent plates 66a, 66b have respective vertical portions defining a chamber 70 therebetween which houses the runners 80a, 80b, 80c therein. Structural details of the runners 80a, 80b, 80c will be described later on.

In the chamber 70, there are disposed a pair of curved guide plates 72a, 72b for effectively sending cooling air produced by the runners 80a, 80b, 80c toward the cooling air outlet 68. The fan structure 24 also has a duct 74 (see FIG. 12) doubling as a casing for introducing cooling air from outside of the fan structure 24 upon rotation of the runners 80a, 80b, 80c.

Figure 10:
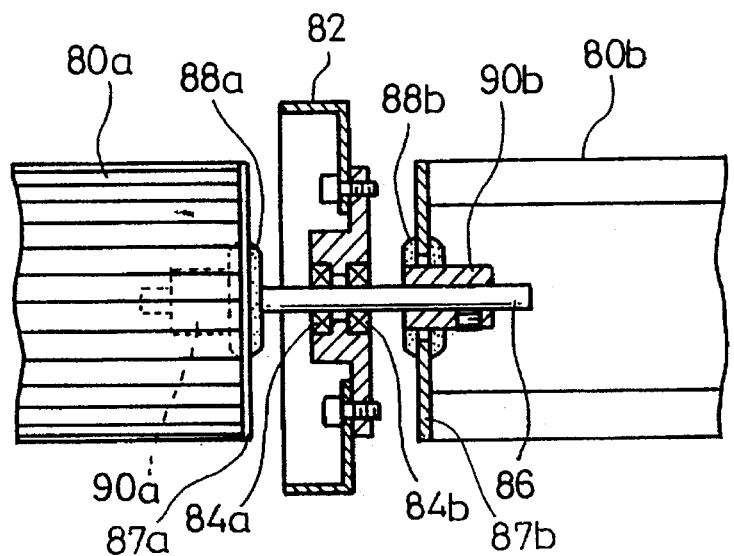
FIG. 10 is a vertical cross-sectional view of runners which are coupled to each other by a coupling disposed therebetween.
Figure 11:
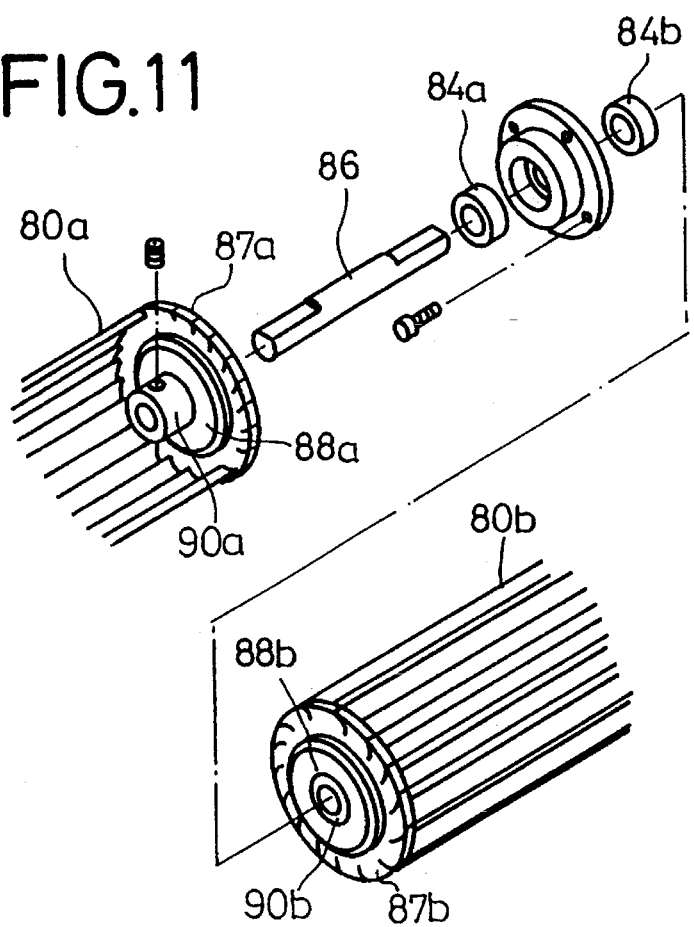
FIG. 11 is a fragmentary exploded perspective view showing the manner in which the runners and the coupling shown in FIG. 10 are coupled to each other.

The fan structure 24 will be described in detail below. As shown in FIG. 8, the fan structure 24 has three runners, i.e., first, second, and third runners 80a, 80b, 80c, positioned coaxially with each other, with a partition 82 interposed between the first and second runners 80a, 80b. As shown in FIGS. 10 and 11, a pair of bearings 84a, 84b is mounted substantially centrally in the partition 82, and a drive shaft 86 extends from the first runner 80a through the bearings 84a, 84b toward the second runner 80b. The runners 80a, 80b have respective circular holder plates 87a, 87b in which respective bushings 88a, 88b of hard rubber are fitted. Tubular joints 90a, 90b having respective axial holes defined therein are fitted respectively in the bushings 88a, 88b at their centers. The drive shaft 86 extends through the tubular joints 90a, 90b. The bushings 88a, 88b, the tubular joints 90a, 90b, and the drive shaft 86 jointly serve as a coupling means. The partition 82 is held in position by and between the first and second plate members 66a, 66b. An identical coupling means is also disposed between the second and third runners 80b, 80c.

As illustrated in FIG. 8, the motor 92 as a rotary actuator is mounted on an outer side of the side wall 62a. The motor 92 has a rotatable drive shaft coupled coaxially to a drive shaft 94 mounted on the first runner 80a.

Figure 12:
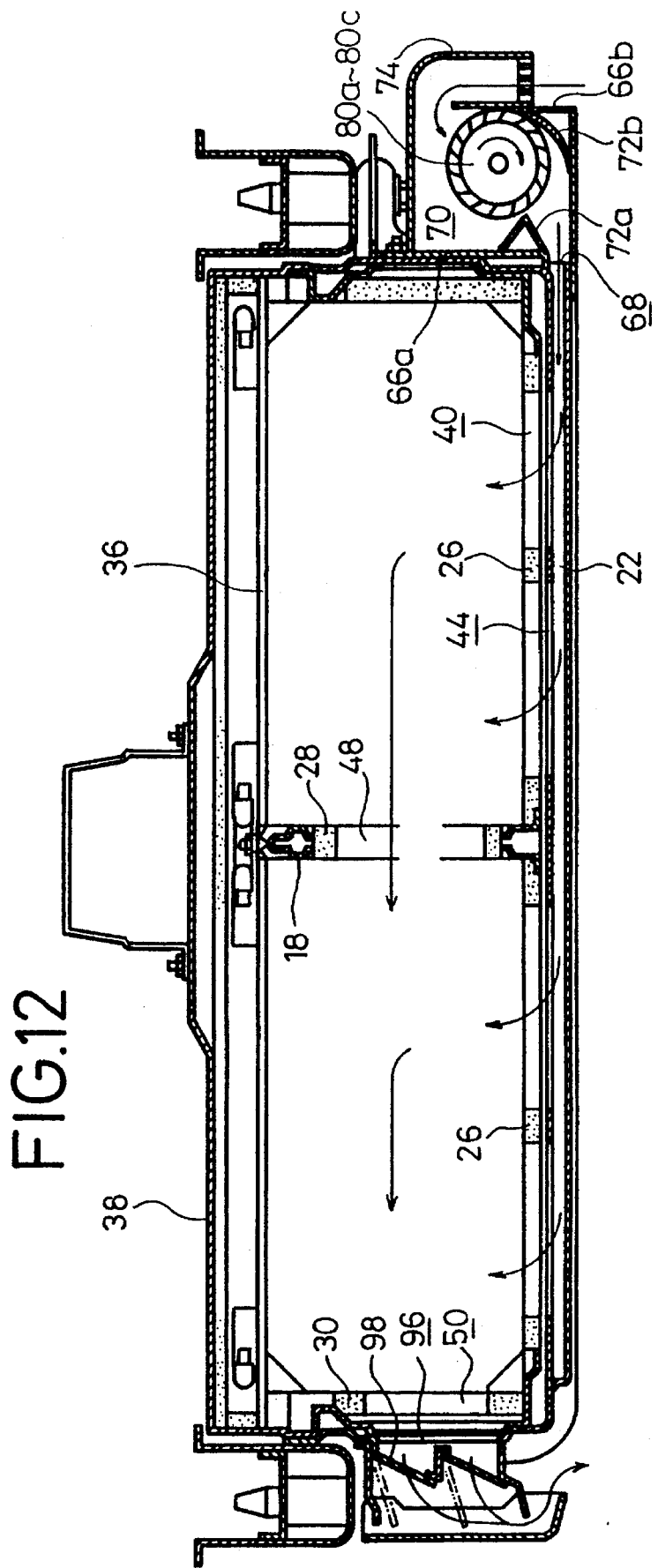
FIG. 12 is a vertical cross-sectional view of the battery box and the fan structure which are assembled together.

As shown in FIG. 12, an air outlet 96 is located outside of the box assembly 12 remotely from the fan structure 24, and openable and closable vanes 98 are positioned across the air outlet 96.

The above battery temperature control structure and the battery box 10 which incorporates same operate as follows:

When the motor 92 is energized, the first runner 80a that is coupled to the rotatable drive shaft of the motor 92 through the drive shaft 94 is rotated, rotating the drive shaft 86. The rotation of the drive shaft 86 between the first and second runners 80a, 80b rotates the second runner 80b, which then causes the drive shaft 86 between the second and third runners 80b, 80c to rotate the third runner 80c. When the first, second, and third runners 80a, 80b, 80c are rotated in the direction indicated by the arrow in FIG. 12, air is introduced from the duct 74 and guided from the chamber 70 into the cooling air outlet 68 by the guide plates 72a, 72b into the air ducts 22a, 22b, 22c. The air then passes from the slits 44 in the air ducts 22a, 22b, 22c through the air inlet slits 40 in the bottom plate of the box assembly 12 and also through the slits 46a, 46b in the lower thermally insulating members 26 toward the sides of the batteries 32. The introduced air now cools the longitudinal side surfaces, which are not thermally insulated, of the batteries 32, and thereafter flows through the slits 50 and the air discharge slots 42 into the air outlet 96, from which it is discharged from the battery box 12 when the vanes 98 are opened.

Figure 13:
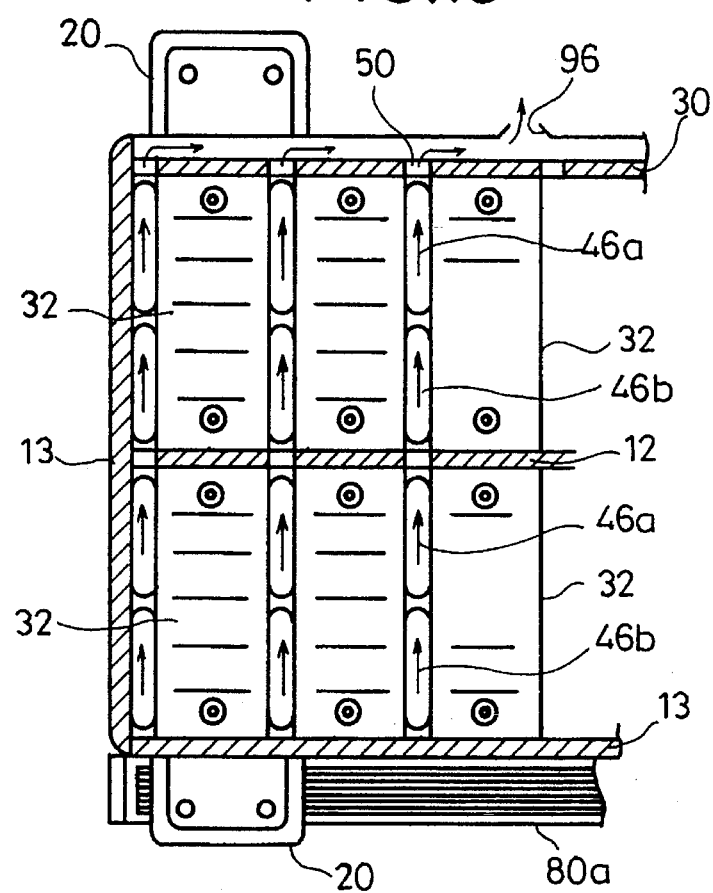
FIG. 13 is a fragmentary plan view of the battery box.

FIG. 13 shows the battery box 10 in plan. The cooling air introduced from the slits 46a, 46b in the lower thermally insulating members 26 flows while cooling the longitudinal side surfaces of the batteries 32, and is then discharged through the slits 50 in the side thermally insulating member 30 and the air outlet 96.

Figure 14:
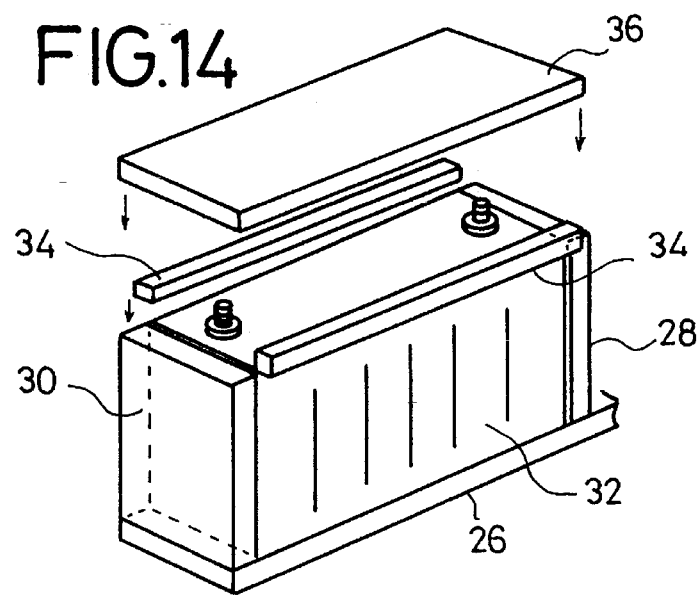
FIG. 14 is a perspective view of a battery combined with thermally insulating members.

FIG. 14 shows in perspective a battery combined with thermally insulating members. In FIG. 14, a battery 32 has four surfaces covered with respective thermally insulating members 26, 28, 30, 36 and the remaining two longitudinal side surfaces exposed. The thermally insulating member 36 is not directly held in intimate contact with an upper surface of the battery 32 because of battery terminals projecting on the upper surface. Therefore, strip-like spacers 34 of certain height are placed on the upper surface of the battery 32, and the thermally insulating member 36 is positioned on the spacers 34 in covering relation to the upper surface of the battery 32.

In the above embodiment, the runners of the fan structure are coupled coaxially with each other, and rotated by the single rotary actuator to force cooling air into the battery box. The runners are coupled by the coupling means including the tubular joints. Accordingly, the rotational force of the rotary actuator is reliably transmitted successively to the runners. Since the single rotary actuator is employed to rotate the runners, the fan structure is relatively simple, has a reduced weight, can easily be inspected and serviced for maintenance, and can be manufactured relatively inexpensive.

Figure 15:
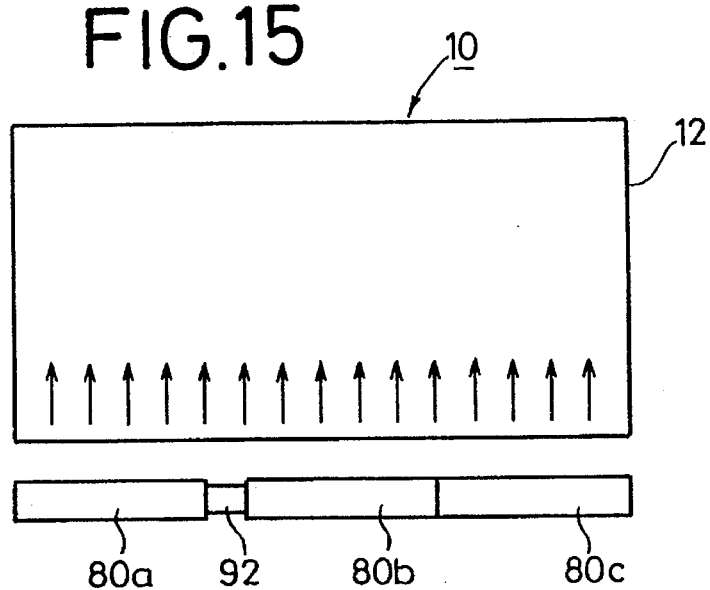
FIG. 15 is a schematic plan view of a battery box associated with a fan structure according to another embodiment of the present invention.

FIG. 15 shows in schematic plan a battery box associated with a fan structure according to another embodiment of the present invention. As shown in FIG. 15, a motor 92 as a single rotary actuator comprises a double-shaft motor and is coupled coaxially between a first runner 80a and a second runner 80b. The second runner 80b is coaxially coupled to a third runner 80c by a coupling means including joints. The fan structure shown in FIG. 15 is suitable for use in applications where the motor 92 should not be exposed.

Figure 16:
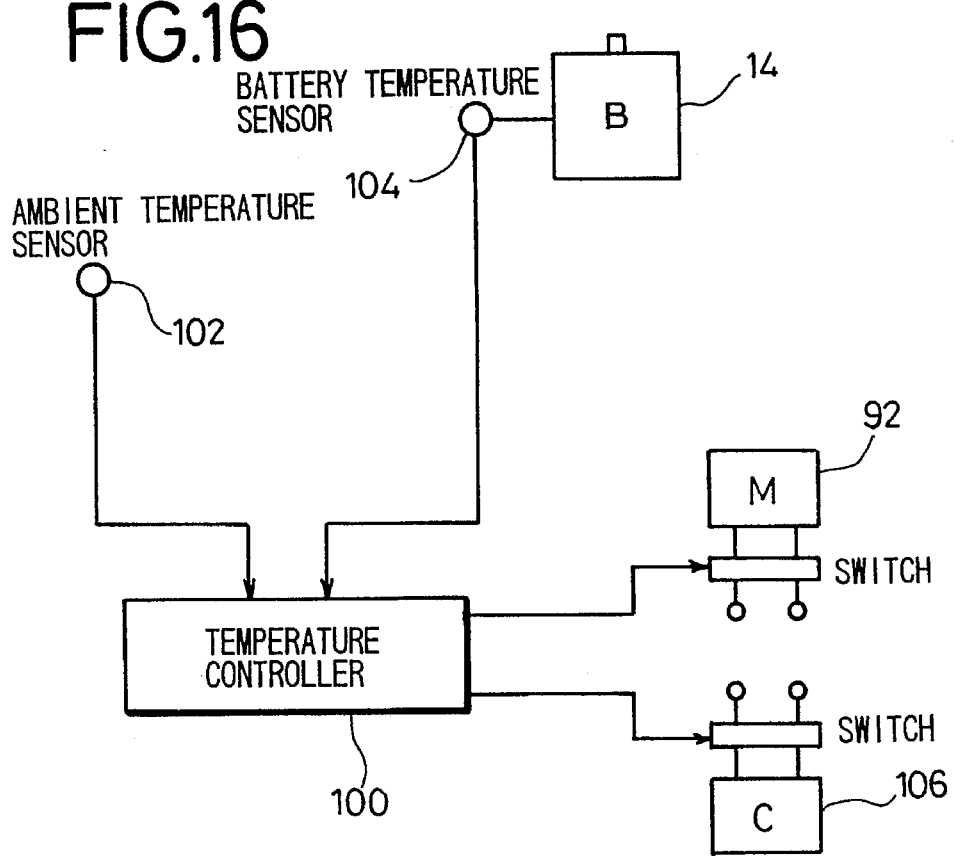
FIG. 16 is a block diagram of a system for controlling the temperature of a battery box.

A system for controlling the temperature of a battery box is shown in FIG. 16. As shown in FIG. 16, a temperature controller 100 is supplied with temperature information from an ambient temperature sensor 102 and temperature information from a battery temperature sensor 104. Based on the supplied temperature information, the temperature controller 100 controls switches to turn on and off the motor 92 and a charger 106 for the batteries housed in the battery box.

Table, given below, shows details of a temperature control process carried out by the system for controlling the temperature of the batteries using the battery temperature and the ambient temperature as parameters.

TABLE

| Battery control temperature | Ambient temperature | Details of temperature control |
| --- | --- | --- |
|  | >50° C. | * Cooling fan stopped (cooling fan operated only when battery temp. exceeds ambient temp.) |
| 20° C. ~ 50° C. | 20° C. ~ 50° C. | * Cooling fan operated<br>* Charging interrupted when battery temp. exceeds 50° C.<br>* Charging resumed when battery temp. is 45° C. or lower<br>* Cooling fan operated when battery temp. exceeds 40° C. |
|  | <20° C. | * Cooling fan stopped when battery temp. is 40° C. or lower (to prevent battery from being excessively cooled and keep battery warm) |

It is assumed that the battery 32 is to be controlled in a temperature range from 20° to 50° C. When the ambient temperature is in excess of 50° C., if the fan structure 24 were operated, then the temperature of the battery 32 would be unduly increased. Therefore, when the ambient temperature is in excess of 50° C., the fan structure 24 is not operated except when the battery temperature exceeds the ambient temperature.

If the fan structure 24 were operated when the ambient temperature is lower than 20° C., the battery 32 would be excessively cooled. Therefore, when the battery temperature is lower than 40° C., the fan structure 24 is not operated.

When the ambient temperature is in the range from 20° to 50° C., the fan structure 24 is operated. When the battery temperature exceeds 50° C., the charging of the battery 32 is interrupted.

Figure 17:
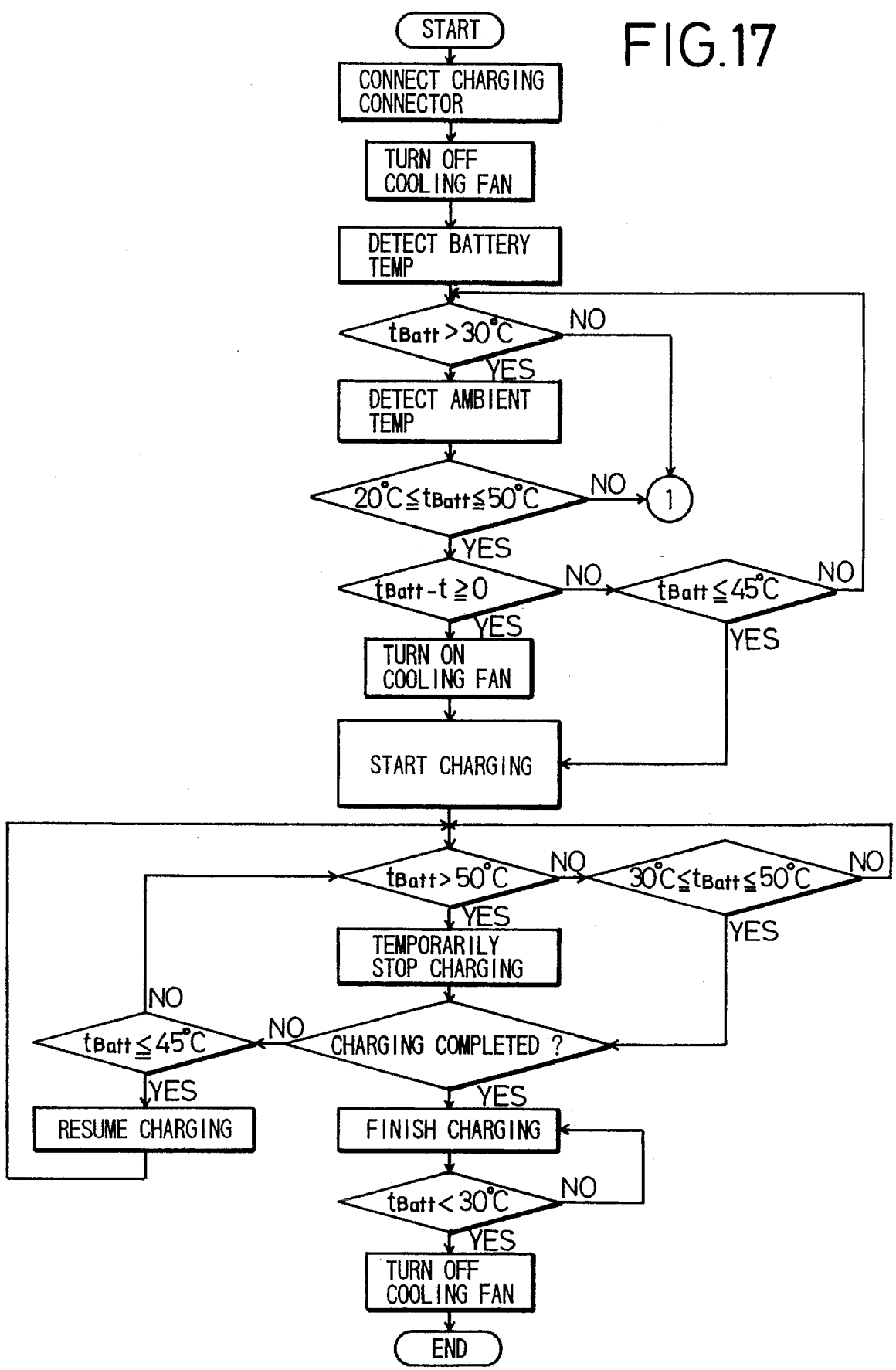
FIGS. 17 and 18 are a flowchart of a control sequence for temperature control.
Figure 18:
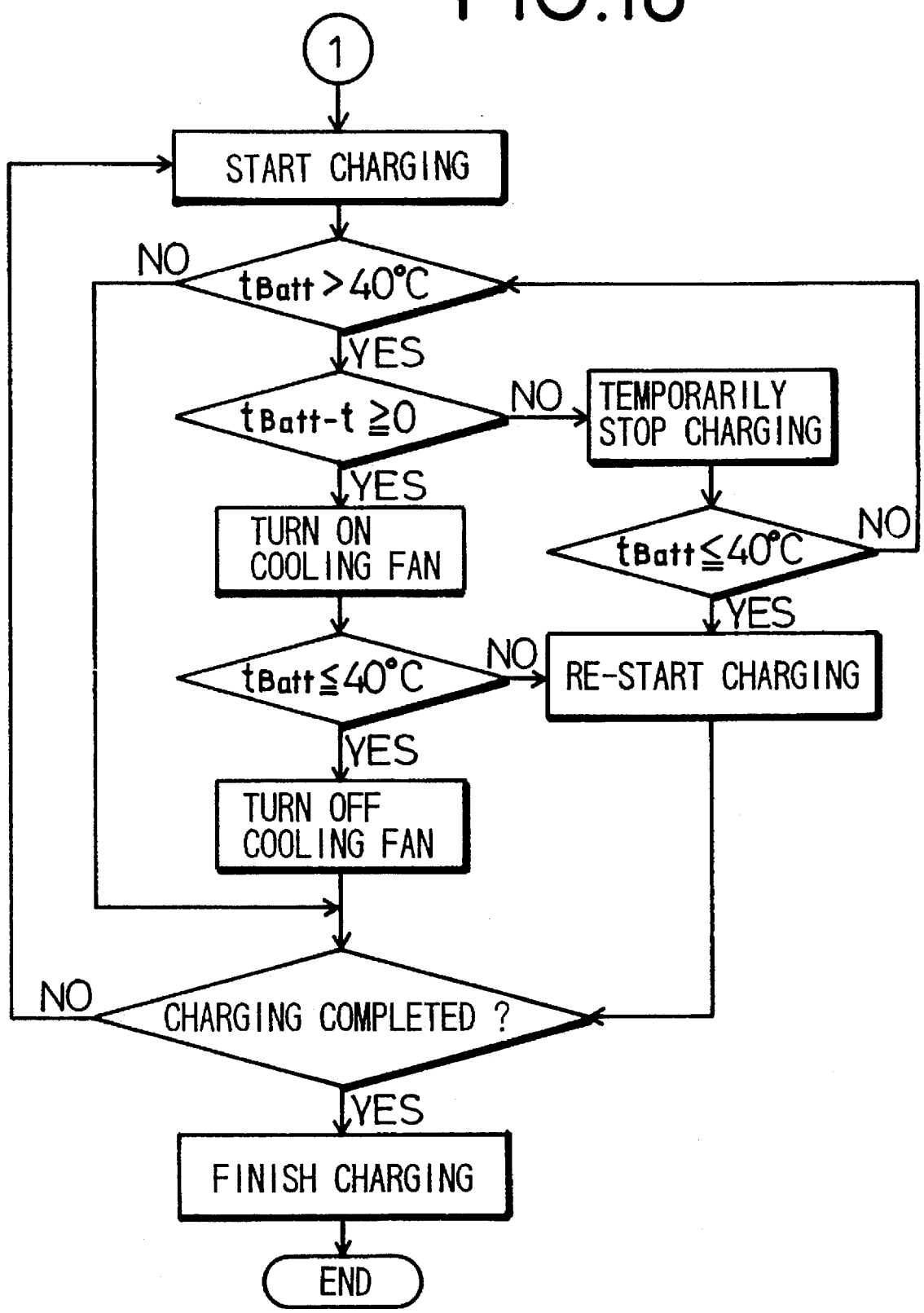

FIGS. 17 and 18 show a control sequence of the temperature control process for achieving the temperature control details given in the Table above.

The temperature control details when the ambient temperature is in the range from 20° to 50° C. are shown in FIG. 17, and the temperature control details when the ambient temperature is higher than 50° C. and lower than 20° C. are shown in FIG. 18.

According to the temperature control process shown in FIGS. 17 and 18, the longitudinal side surfaces of each of the batteries 32 are cooled by air to place all the batteries 32 in a temperature range from 20° to 50° C. Since the batteries 32 are cooled under substantially the same cooling conditions, any temperature differences between the batteries are small.

The six cells in each of the batteries are cooled at their sides, i.e. at the ends of their plates, under substantially the same cooling conditions, whereby any temperature differences between the cells of batteries are also small.

Consequently, the batteries housed in the battery box and cooled by the fan structure have a service life that can be predicted well and hence have a desired durability.

Figure 19:
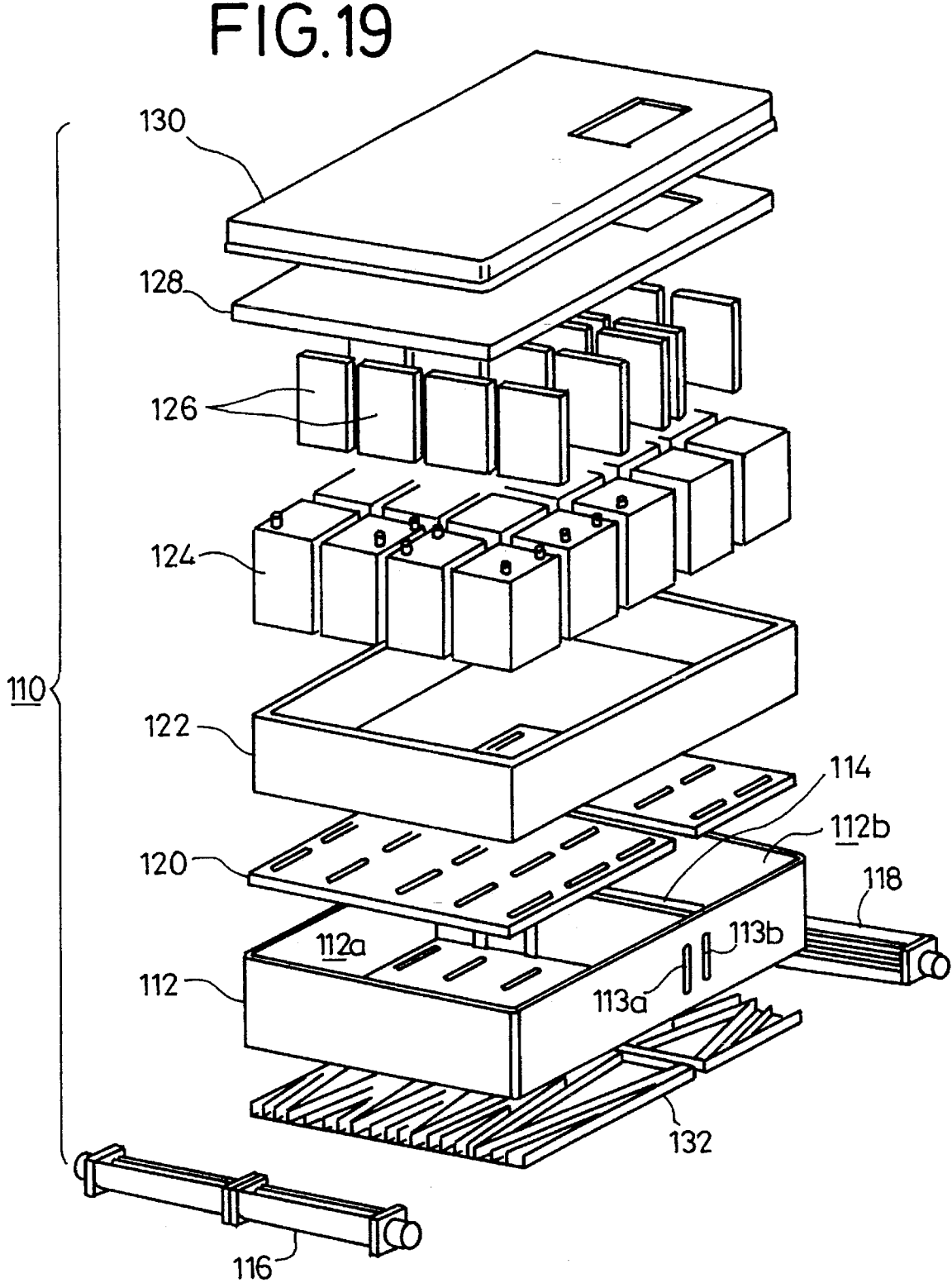
FIG. 19 is an exploded perspective view of a battery box according to still another embodiment of the present invention.

FIG. 19 shows a battery box according to still another embodiment of the present invention. In the above embodiment, cooling air flows in the battery box 10 in a direction perpendicular to the longitudinal direction of the battery box 10. According to the embodiment shown in FIG. 19, cooling air flows in a battery box in the longitudinal direction thereof.

As shown in FIG. 19, a battery box 110 includes a bottomed box assembly 112 which is divided into two compartments 112a, 112b by a center frame 114 disposed in the bottomed box assembly 112 transversely across its longitudinal direction. The compartments 112a, 112b of the bottomed box assembly 112 are associated with fan structures 116, 118, respectively, which are positioned at respective longitudinal ends of the bottomed box assembly 112. The bottomed box assembly 112 includes a pair of opposite longitudinal side walls each having a pair of vertically oblong openings or slits 113a, 113b defined therein that are held in communication with the compartments 112a, 112b, respectively.

The battery box 110 also includes a lower thermally insulating member 120, a side thermally insulating member 122, a plurality of batteries 124, central thermally insulating members 126, and an upper thermally insulating member 128, which are successively placed in the box assembly 112, and a lid 130 that is placed over the upper thermally insulating member 128. A pair of air ducts 132 is disposed beneath the box assembly 112.

Figure 20:
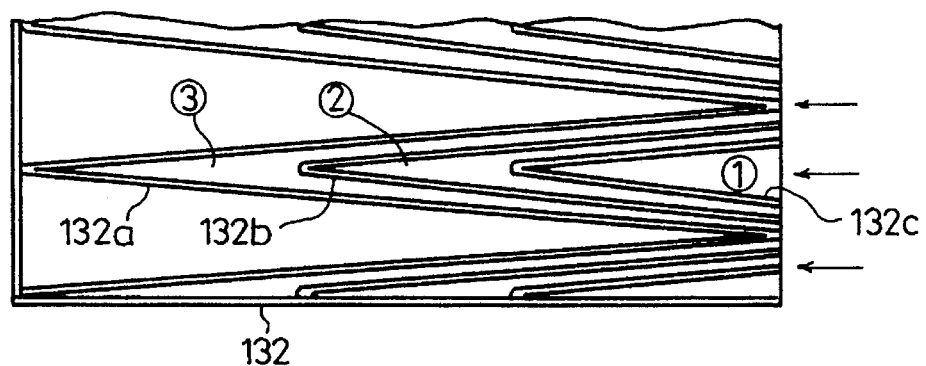
FIG. 20 is an enlarged fragmentary plan view of an air duct of the battery box according to the embodiment shown in FIG. 19.

Each of the air ducts 132 is shown in plan in FIG. 20. The air duct 132 has larger, medium, and smaller V-shaped plates 132a, 132b, 132c mounted on a bottom plate thereof. When cooling air is supplied from the fan structures 116, 118 into the air ducts 132, the cooling air is divided by the V-shaped plates 132a, 132b, 132c into equal amounts ①, ②, ③ of cooling air, which are then introduced through inlet slits defined in a bottom plate of the box assembly 112 into the compartments 112a, 112b. In the compartments 112a, 112b, the cooling air uniformly cools the batteries 124, and is then discharged out of the battery box 110 through the slits 113a, 113b.

Figure 21:
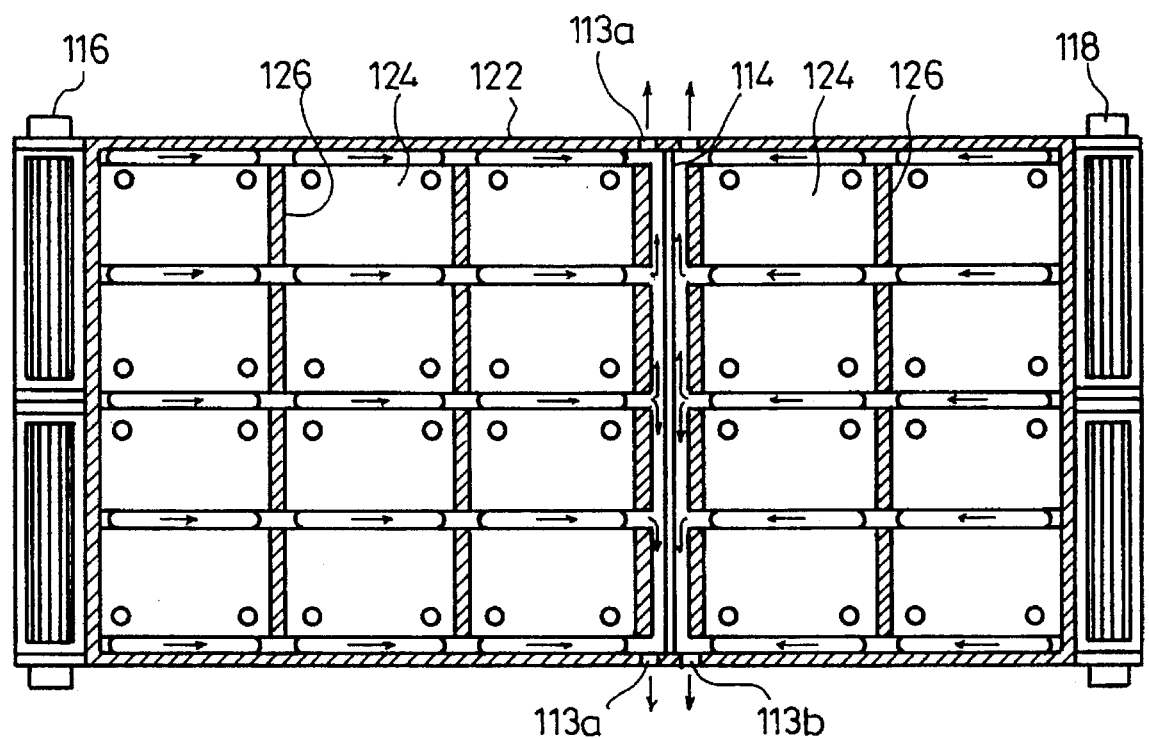
FIG. 21 is a plan view showing the manner in which batteries housed in the battery box shown in FIG. 19 are cooled.

FIG. 21 shows the manner in which the batteries 124 housed in the battery box 110 shown in FIG. 19 are cooled. Cooling air introduced into the battery box 110 by the fan structure 116, shown on the left-hand side in FIG. 21, flows as indicated by the arrows, cooling longitudinal side surfaces of the batteries 124, and then flows along the center frame 114, after which it is discharged from the battery box 110 through the slits 113a, 113b. Cooling air introduced into the battery box 110 by the fan structure 118, shown on the right-hand side in FIG. 21, flows in a similar manner.

The above temperature control structure in the battery box 110 shown in FIGS. 19 through 21 is particularly suitable for cooling large-size battery boxes.

Instead of the illustrated center frame 114, a center frame of a crisscross shape as viewed in plan with a single- or double-walled frame member may be mounted in the box assembly. Such a center frame is effective to increase the rigidity of the battery box or may have an air discharge passage defined therein.

Figure 22:
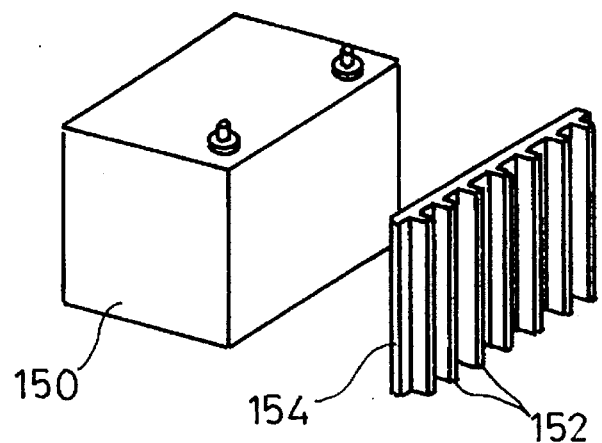
FIG. 22 is a perspective view of a battery and a heat conducting plate suitable for temperature control.

FIG. 22 shows in perspective a battery and a heat conducting plate suitable for temperature control. In FIG. 22, a heat conducting plate 154 with heat radiating fins 152 is attached to a longitudinal side surface of a battery 150. Since the heat conducting plate 154 has a large heat radiating surface, it is capable of exchanging heat highly efficiently.

Figure 23:
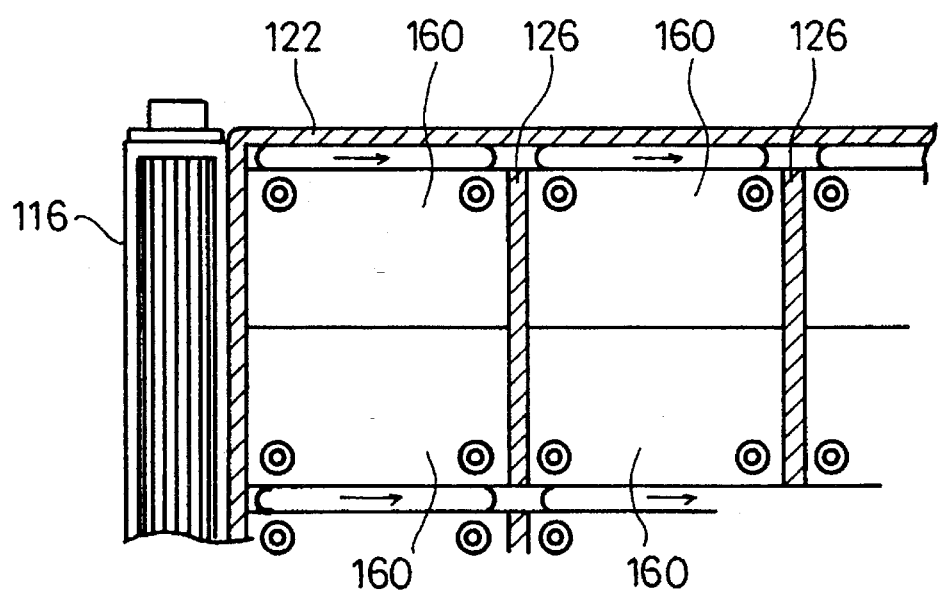
FIG. 23 is a fragmentary plan view of an arrangement of batteries in a battery box according to yet still another embodiment of the present invention.

FIG. 23 illustrates an arrangement of batteries in a battery box according to yet still another embodiment of the present invention. As shown in FIG. 23, adjacent batteries 160 have respective confronting longitudinal side surfaces held intimately against each other, and other opposite longitudinal side surfaces exposed for being cooled by cooling air introduced into the battery box. This arrangement of batteries 160 can be employed if the batteries 160 are small, of a low profile, and can withstand a relatively high temperature, so that the cooling capability of the battery box may be lower than those of the previous embodiments. The embodiment shown in FIG. 23 is advantageous in that the thermally insulating material used may be of a smaller quantity and the battery box may be reduced in size.

Figure 24:
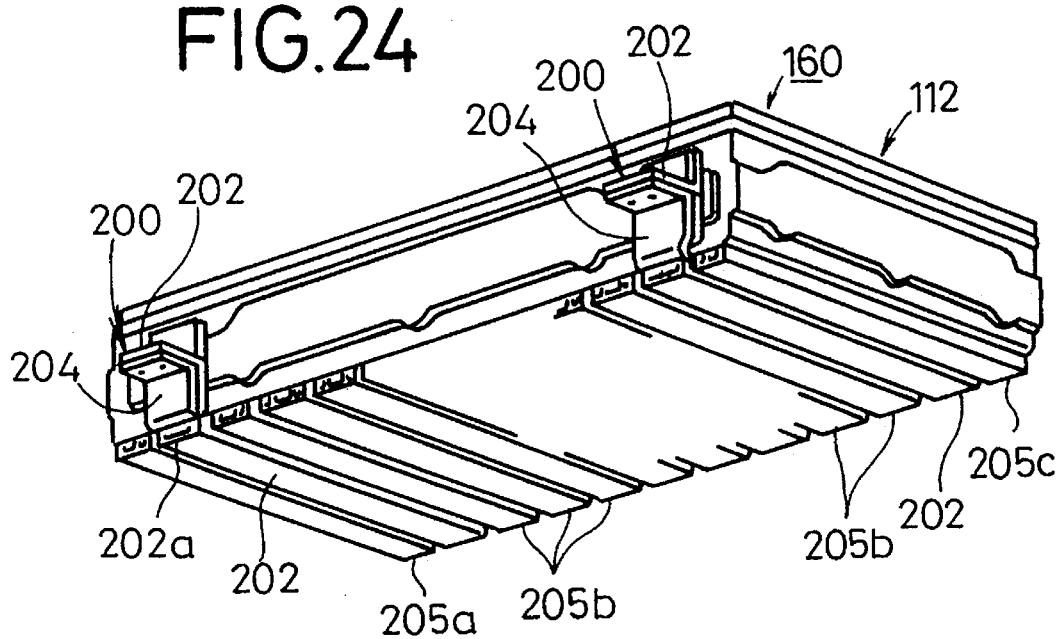
FIG. 24 is a perspective view of a battery box according to a further embodiment of the present invention.
Figure 25:
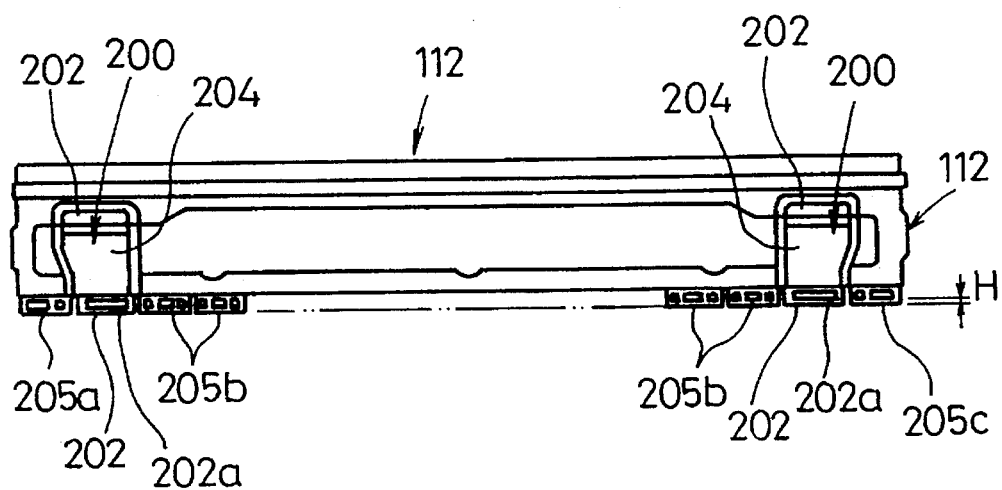
FIG. 25 is a side elevational view of the battery box shown in FIG. 24.

FIGS. 24 and 25 show a battery box according to a further embodiment of the present invention. In this embodiment, air ducts 205a, 205b, 205c are fastened to a bottom plate of a box assembly 112 by bolts or the like (not shown), and support frames 200 are fixed to front and rear areas, respectively, of the box assembly 112 by spot welding or the like. Each of the support frames 200 comprises a horizontal support 202 mounted on a lower surface of the bottom plate of the box assembly 112, and a vertical support 204 mounted on a side wall of the box assembly 112.

The horizontal support 202 of each of the support frames 200 is of an elongate hollow structure extending in the same direction as the air ducts 205a–205c, and doubles as a duct for applying cooling air to longitudinal side surfaces of batteries (not shown) housed in the battery box. Each of the horizontal supports 202 has an air inlet end 202a opening toward a fan structure (not shown). As with air ducts 205a–205c, the horizontal supports 202 introduce cooling air supplied from the fan structure through the bottom plate of the box assembly 112 into the battery box. Since cooling air is applied from the entire lower surface, including portions corresponding to the horizontal supports 202, of the battery box to the longitudinal side surfaces of batteries housed therein, the cooling capability of the battery box is high. Furthermore, inasmuch as the box assembly 112 is reinforced by the support frames 200, it is rigid enough to keep itself from being deformed when heavy batteries are housed in the battery box.

As shown in FIG. 25, the lower surface of each of the horizontal supports 202 is lower than the lower surface of each of the air ducts 205a, 205b, 205c by a distance H of about 2 mm, for example. When the battery box is placed on a ground surface or a floor, only the lower surfaces of the horizontal supports 202 which are highly rigid are held in contact with the ground surface or the floor for thereby protecting the air ducts 205a, 205b, 205c from damage. The battery box which houses the batteries is quite heavy as it may weigh about 500 kg. When the heavy battery box is loaded on or unloaded from a vehicle, it can be carried and lifted and lowered by a lifter which may support the battery box at the horizontal supports 202.

Figure 26:
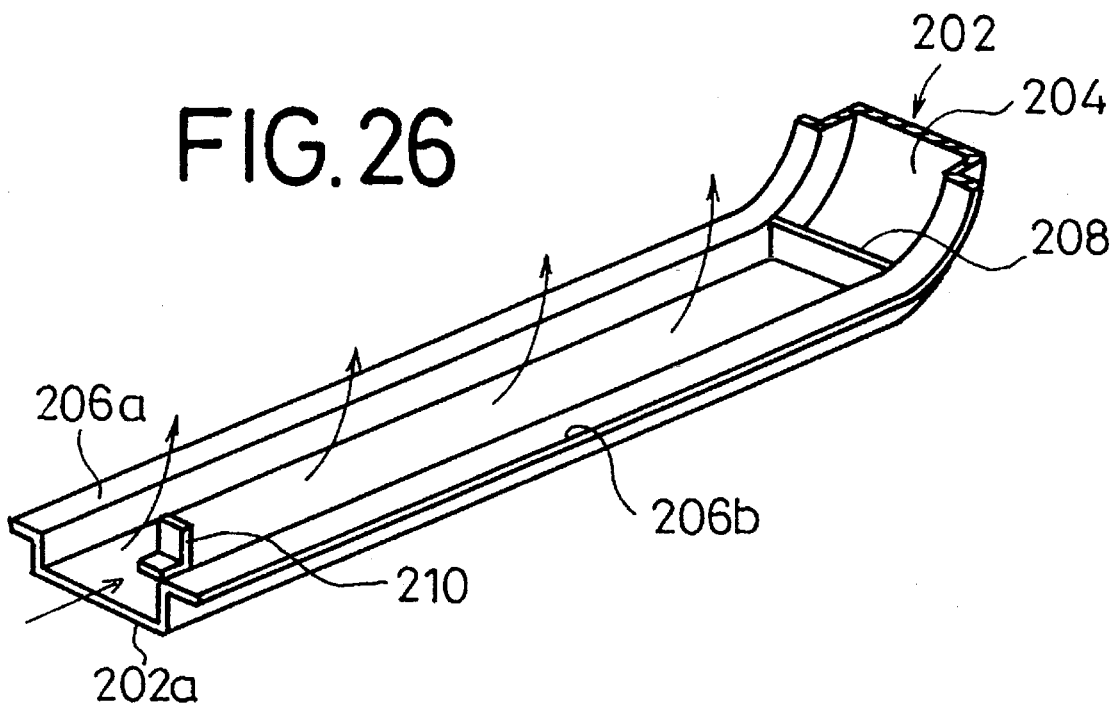
FIG. 26 is a perspective view of a horizontal support in the battery box shown in FIG. 24.

FIG. 26 illustrates a specific structure of the horizontal support 202. As shown in FIG. 26, the horizontal support 202 is of an upwardly open channel-shaped cross section and has a pair of laterally spaced flanges 206a, 206b bent outwardly from its upper end. When the flanges 206a, 206b are spot-welded or otherwise joined to the lower surface of the bottom plate of the box assembly 112, the horizontal support 202 takes on a hollow structure.

The flanges 206a, 206b are attached to the lower surface of the bottom plate of the box assembly 112 so as not to allow air to leak across the flanges 206a, 206b. A partition 208 is attached to the horizontal support 202 near the vertical support 204 for closing the hollow space in the horizontal support 202 to prevent air leakage into the vertical support 204. The horizontal support 210 also has a baffle plate 210 near the air inlet end thereof for uniformly dispersing the air flow introduced from the air inlet end.

Figure 27:
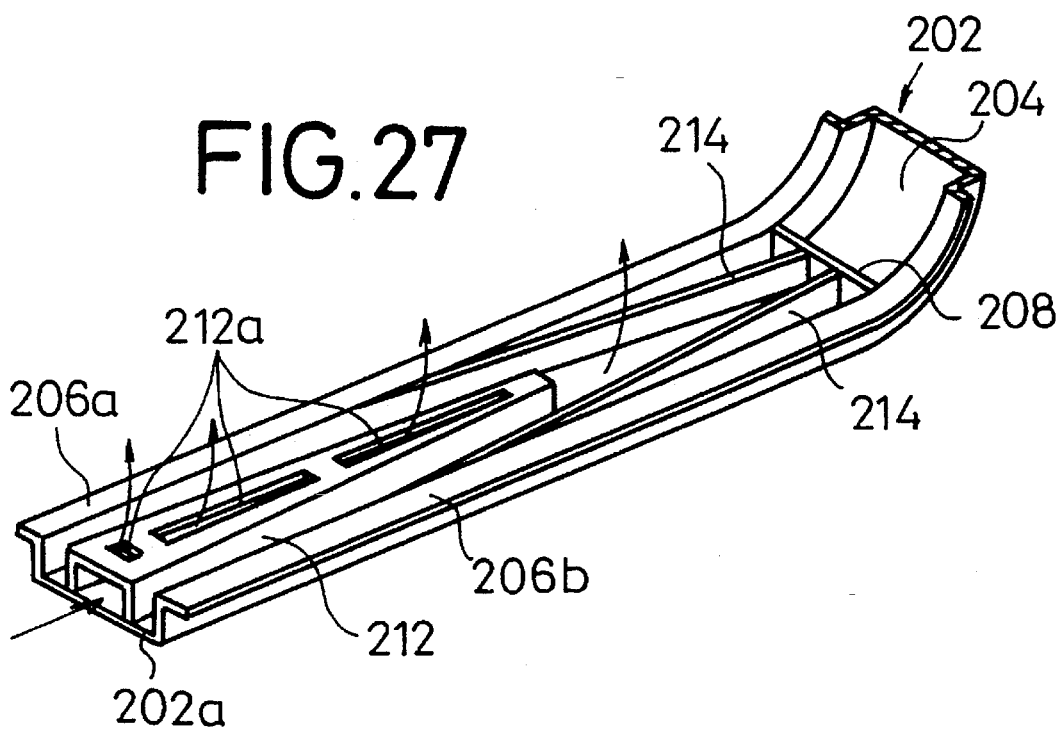
FIG. 27 is a perspective view of a horizontal support according to another embodiment of the present invention.

FIG. 27 shows a horizontal support 202 according to another embodiment of the present invention. The horizontal support 202 shown in FIG. 27 has a box-shaped dispersing plate 212 and a pair of plate-shaped dispersing plates 214 for uniformly dispersing the air flow, the dispersing plates 212, 214 defining a plurality of air passages in the horizontal support 202. The box-shaped dispersing plate 212 has a plurality of slits 212a defined in an upper wall thereof for discharging air upwardly therethrough.

Figure 28:
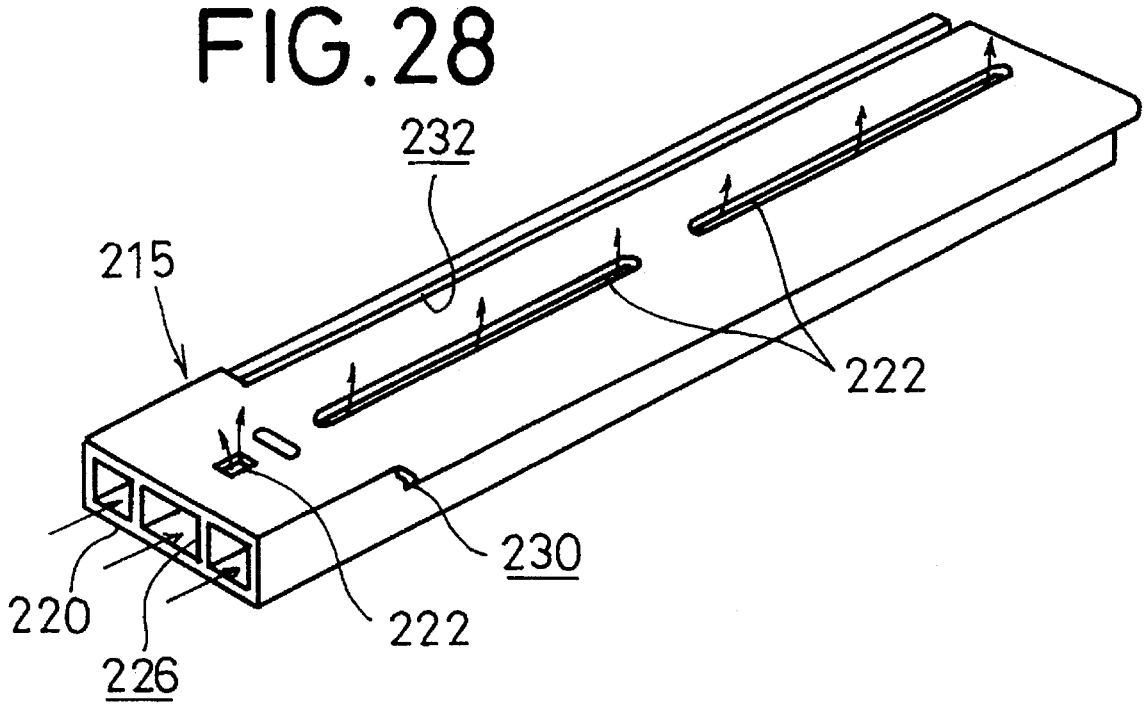
FIG. 28 is a perspective view of an air duct according to another embodiment of the present invention.
Figure 29:
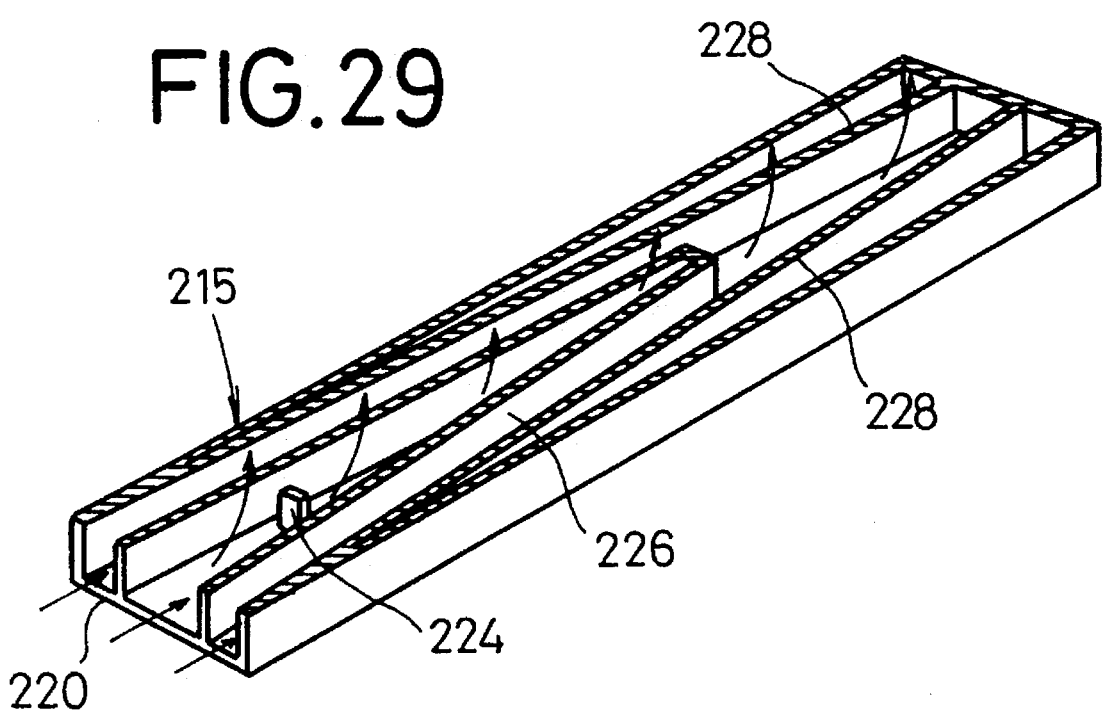
FIG. 29 is a sectional perspective view of the air duct shown in FIG. 28.

An air duct according to another embodiment of the present invention, which may be used as each of the air ducts 22a through 22c and 205a through 205c, will be described below with reference to FIGS. 28 through 30.

An air duct 215 is in the form of a hollow elongate rectangular parallelepiped or of a tubular shape and is integrally molded of a synthetic resin by injection molding or blow molding. The air duct 215 has an air inlet end 220 to be coupled to a fan structure such as the fan structure 24, 116, 118 described above. The synthetic resin material should be preferably a material having a high impact strength, such as polypropylene or the like.

The air duct 215 has a plurality of longitudinal slits 222 defined in an upper panel thereof for discharging air upwardly therethrough. The air duct 215 also has a plurality of integrally molded dispersing plates 224 through 228 disposed therein for uniformly dispersing the air flow, the dispersing plates 224 through 228 defining a plurality of air passages in the air duct 215.

A plurality of such air ducts 215 are disposed parallel to each other on the lower surface of the bottom plate of the box assembly 12 or 112 for introducing uniformly dispersed air flows into the box assembly 12 or 112. The air ducts 215 are fastened to the bottom plate of the box assembly 12 or 112 by screws or the like. Therefore, the box assembly 12 or 112 may be relatively simple in structure. Since the air ducts 215 are subsequently attached to the box assembly 12 or 112, they can be installed or replaced with ease.

The air duct 215 has an elongate hook 230 extending along and projecting laterally and downwardly from a corner of the upper panel thereof, and a groove 232 defined in and extending along an opposite corner of the upper panel thereof. The hook 230 and the groove 232 extend in the longitudinal direction of the air duct 215. The hook 230 serve to snap resiliently in the groove 232 of an adjacent air duct 215, and the groove 232 of the air duct 215 serves to receive the hook 230 of an adjacent air duct 215.

Figure 30:
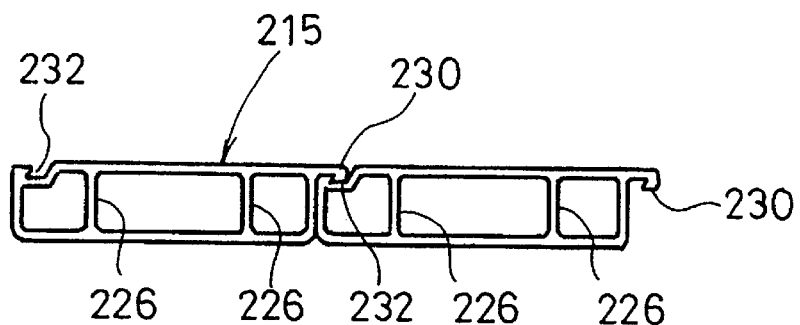
FIG. 30 is a side elevational view of air ducts each shown in FIG. 28 which are joined to each other.

As shown in FIG. 30, two adjacent air ducts 215 are mechanically coupled to each other by the hook 230 of one of the air ducts 215 which snaps resiliently in the groove 232 of the other air duct 215. Thus, the adjacent air ducts 215 can be coupled in a single operation. Since a plurality of air ducts 215 which are coupled to each other in this manner can be attached to the lower surface of the box assembly 12 or 112, they can be installed efficiently with a reduced number of screws in a simple attaching process. Consequently, the battery box can be assembled inexpensively.

FIGS. 31, 32, 35, and 37 show air ducts according to other embodiments of the present invention which will be described below. Those parts of the air ducts shown in FIGS. 31, 32, 35, and 37 which are identical to those shown in FIGS. 28 through 30 are denoted by identical reference numerals, and will not be described in detail below.

Figure 31:
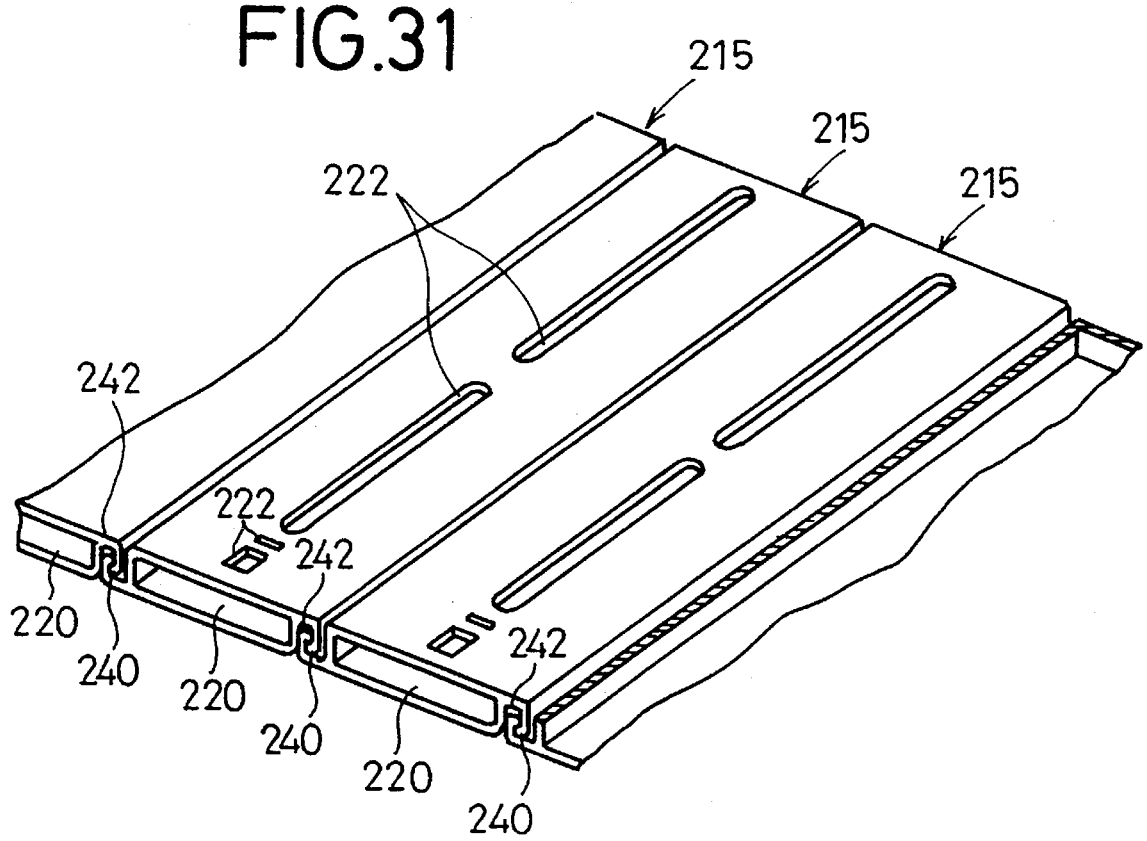
FIG. 31 is a fragmentary perspective view of joined air ducts according to still another embodiment of the present invention.

FIG. 31 shows joined air ducts according to still another embodiment of the present invention. Each of the air ducts, indicated by 215, has a first elongate hook 240 extending along and projecting laterally and downwardly from a corner of the upper panel thereof, and a second elongate hook 242 extending along and projecting laterally and upwardly from an opposite corner of the lower panel thereof. The first and second hooks 240, 242 extend in the longitudinal direction of the air duct 215. Two adjacent air ducts 215 are mechanically coupled to each other by their respective confronting first and second hooks 240, 242 which are held in resiliently snapping engagement with each other. Each of the air ducts 215 has a single air passage defined therein with no dispersing plate disposed therein.

Figure 32:
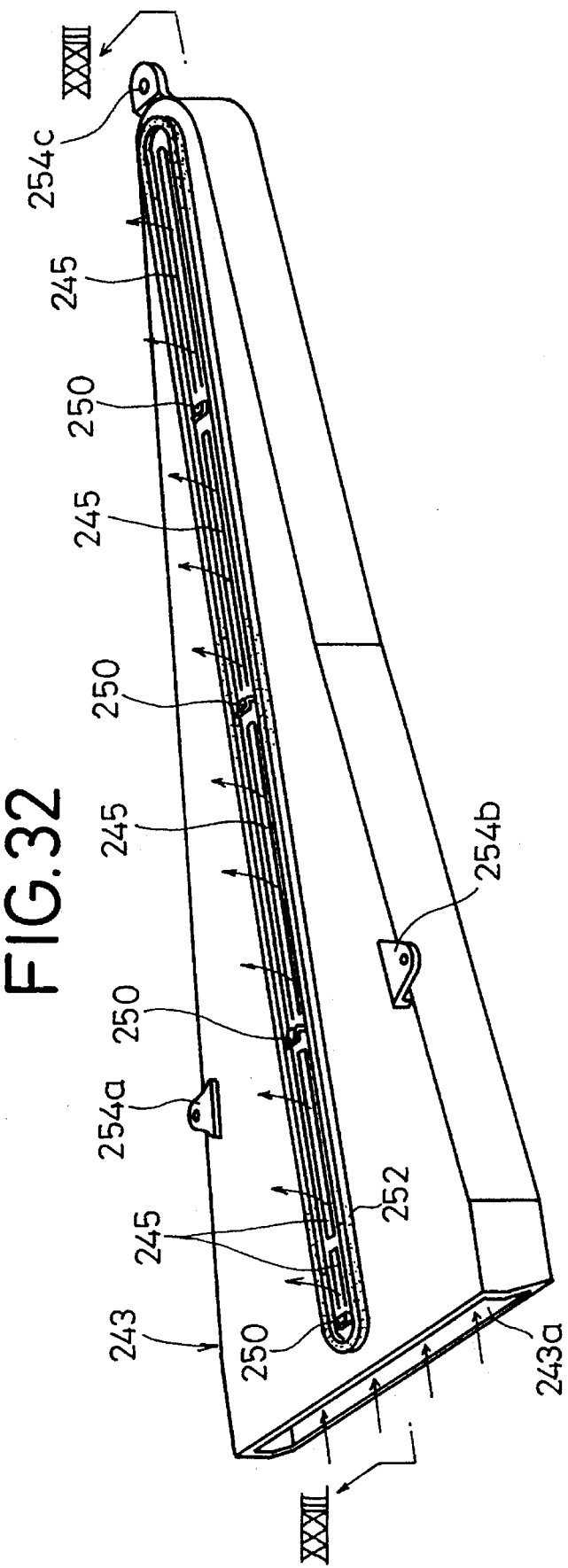
FIG. 32 is a perspective view of an air duct according to yet still another embodiment of the present invention.

FIG. 32 illustrates an air duct according to yet still another embodiment of the present invention. In FIG. 32, the air duct, generally indicated by 243, comprises a tapered tubular body having a row of slits 245 defined in an upper panel thereof and a plurality of hooks 250 disposed on the upper panel thereof and extending in one direction, i.e., toward a wider air inlet end 243a. Each of the hooks 250 is positioned between adjacent two of the slits 245.

The slits 245 and the hooks 250 are surrounded by a gasket 252 which may comprise a strip of synthetic rubber such as EPDM, for example, applied to the upper panel of the air duct 243, a sealant applied to the upper panel of the air duct 243, or a seal member of soft synthetic resin integrally molded with the upper panel of the air duct 243.

The air duct 243 also has a left-hand flange 254a integrally formed with a left-hand edge of the upper panel of the air duct 243, a right-hand flange 254b integrally formed with a right-hand edge of the upper panel of the air duct 243, and an end flange 254c integrally formed with a narrower end of the air duct 243 remote from the air inlet end 243a.

Figure 33:
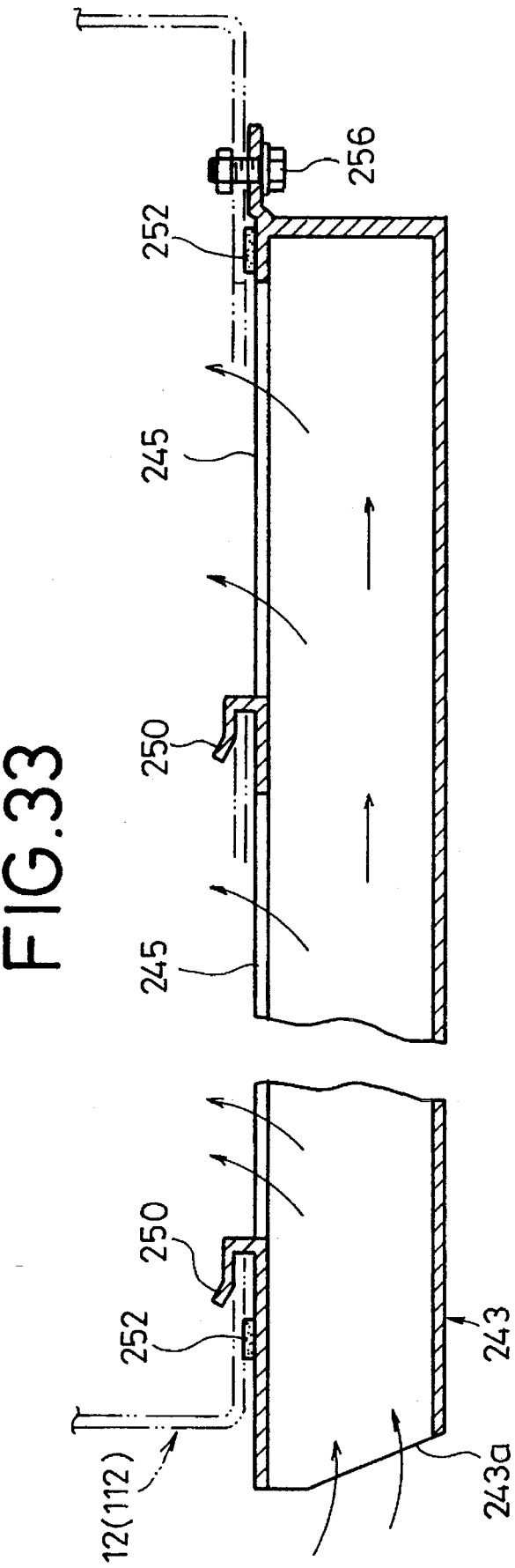
FIG. 33 is a fragmentary cross-sectional view taken along line XXXIII—XXXIII of FIG. 32.

The air duct 243 shown in FIG. 32 is installed on the battery box as follows:

As shown in FIG. 33, the air duct 243 is temporarily attached to the box assembly 12 or 112 by the hooks 250 which are inserted in air inlet slits defined in the bottom plate of the box assembly 12 or 112 and engage edges of the air inlet slits. Thereafter, the end flange 254c is fastened to the bottom plate of the box assembly 12 or 112 by a bolt and nut 256.

Figure 34:
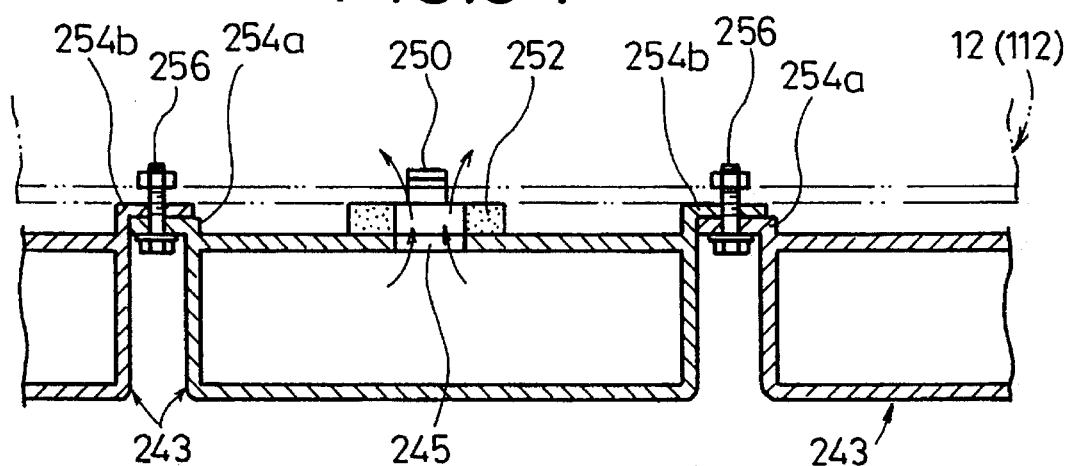
FIG. 34 is a fragmentary cross-sectional view of air ducts each shown in FIG. 32 which are joined to each other.

FIG. 34 shows plural air ducts 243 each shown in FIG. 32 which are joined to each other. In order to allow the left- and right-hand flanges 254a, 254b of two adjacent air ducts 243 to be superimposed with each other, the height of the left-hand flange 254a from the upper surface of the right-hand air duct 243 is smaller than the height of the right-hand flange 254a from the upper surface of the left-hand air duct 243. With the left- and right-hand flanges 254a, 254b superimposed with each other, the air ducts 243 are fastened to the lower surface of the bottom plate of the box assembly 12 or 112 by bolts and nuts 256, the nuts being welded to the upper surface of bottom plate of the box assembly 12 or 112.

The gaskets 252 of the respective air ducts 243 are compressed between the bottom plate of the box assembly 12 or 112 and the upper surfaces of the air ducts 253, preventing air from leaking from between the bottom plate of the box assembly 12 or 112 and the slits 245.

Air introduced from the air inlet ends 243a of the air ducts 243 passes through the air passages in the air ducts 243, and is introduced through the slits 245 into the box assembly 12 or 112 as indicated by the arrows in FIG. 34.

In this embodiment, the air ducts 243 can easily and efficiently be installed on the bottom plate of the box assembly 12 or 112 by bringing the hooks 250 into engagement with edges of the slits 245 thereby to temporarily attach the air ducts 243, and then fastening the air ducts 243 to the bottom plate of the box assembly 12 or 112 with bolts and nuts 256.

Figure 35:
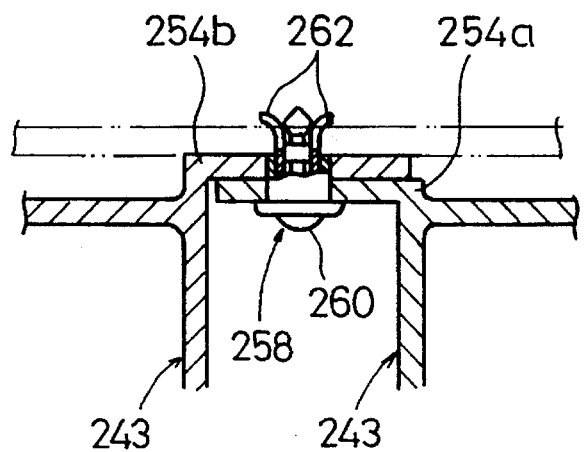
FIG. 35 is a fragmentary cross-sectional view showing a joint of air ducts according to another embodiment of the present invention.

The flanges 254a, 254b, 254c of the air ducts 243 may not be fastened to the bottom plate of the box assembly 12 or 112 by bolts and nuts 256. Instead, as shown in FIG. 35, the flanges 254a, 254b, 254c of the air ducts 243 may be fixed to the bottom plate of the box assembly 12 or 112 by clips 258 inserted respectively in holes defined in the bottom plate of the box assembly 12 or 112. Each of the clips 258 has a screw 260 which, when tightened, causes a rear clip end 262 to spread to keep the clip 258 firmly fitted in the hole defined.

Figure 36:
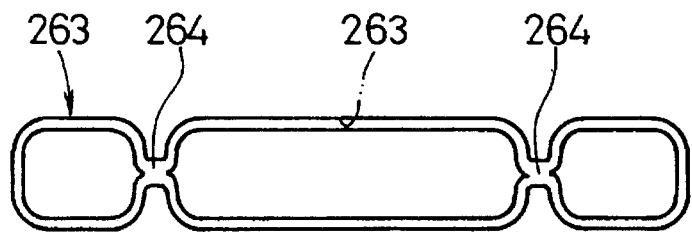
FIG. 36 is a side elevational view of an air duct according to a further embodiment of the present invention.
Figure 37:
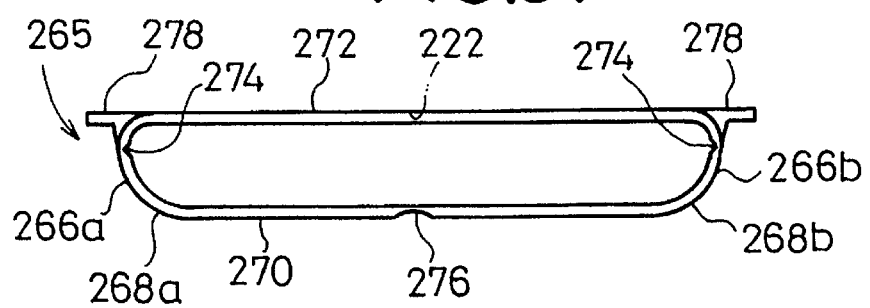
FIG. 37 is a side elevational view of an air duct according to a still further embodiment of the present invention.

FIG. 36 shows an air duct according to a further embodiment of the present invention, for use in a battery cooling device. As shown in FIG. 36, the air duct, indicated by 263, is of a hollow structure having two regions vertically closed or constricted into dispersing plates 264 extending longitudinally, i.e., in the direction normal to the sheet of FIG. 36, thus defining a plurality of air passages in the air duct 263. Although no hook and no groove are shown in FIG. 36, the air duct 263 may have a hook and a groove for combining itself with other air ducts and fastening itself to a box assembly. The air duct 263 shown in FIG. 36 is of a simpler configuration than the air duct 215, and hence a die for casting the air duct 263 can be produced easily and inexpensively.

FIGS. 37 through 40 show an air duct according to a still further embodiment of the present invention. The air duct, denoted by 265, has notches which allow the air duct 265 to be easily deformed when subjected to undue external forces.

Specifically, the air duct 265 is of an elongate tubular structure comprising a pair of laterally spaced side walls 266a, 266b, a pair of arcuate corners 268a, 268b extending downwardly from respective lower edges of the side walls 266a, 266b, a flat lower wall 270 extending horizontally between lower edges of the arcuate corners 268a, 268b, and a flat upper wall 272 extending horizontally between upper edges of the side walls 266a, 266b. The side walls 266a, 266b have respective notches 274 defined in respective inner surfaces thereof, and the lower wall 270 has a notch 276 defined in a lower surface thereof. The notches 274, 276 extend longitudinally in the direction normal to the sheet of FIG. 37. The air duct 265 also has a pair of flanges 278 extending outwardly from the respective upper edges of the side walls 266a, 266b for being fastened, as by screws, to the bottom plate of the box assembly 12 or 112.

The air duct 265 has a single air passage defined therein with no dispersing plate disposed therein.

Figure 38:
FIG. 38 is a side elevational view showing the manner in which the air duct shown in FIG. 37 is used.
Figure 39:
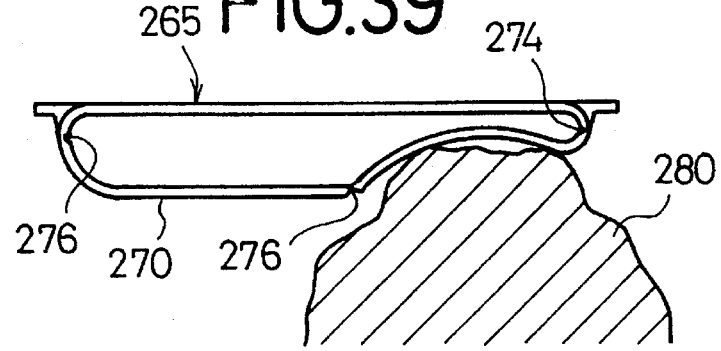
FIG. 39 is a side elevational view showing the manner in which the air duct shown in FIG. 37 operates.
Figure 40:
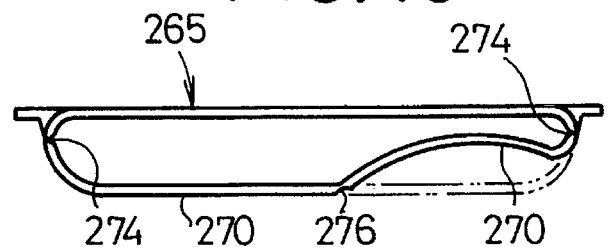
FIG. 40 is a side elevational view showing the manner in which the air duct shown in FIG. 37 operates.

The air duct 265 operates in a manner as shown in FIGS. 38 through 40.

The air duct 265 is attached to a battery box (not shown) in a normal condition as shown in FIG. 38.

When the air duct 265 attached to the battery box collides with an obstacle 280 on the ground while the vehicle is running, as shown in FIG. 39, the notches 274, 276 allow a portion of the lower wall 270 to be deformed.

After the air duct 265 is brought out of contact with the obstacle 280, the lower wall 270 may remain deformed as shown in FIG. 40. Even when the lower wall 270 remains deformed, since the other portion of the lower wall 270 is undeformed, the air duct 265 is able to perform its function to deliver air. After the air duct 265 leaves the obstacle 280, the lower wall 270 may restore its shape from the deformed condition under its own resiliency.

According to this embodiment, the lower wall 270 has a large lateral dimension, and its lateral ends are integral with the respective arcuate corners 268a, 268b. Therefore, the air duct 265 has relatively large resiliency, allowing itself to absorb shocks when subjected to external impacts. When undue external forces are applied, only a portion of the lower wall 270 is deformed because of the notches 274, 276, leaving the other portion of the lower wall 270 undeformed thereby to permit the air duct 265 to perform its function. The deformed air duct 265 can easily be replaced with an air duct of normal shape simply by loosening the screws off the flanges 278.

With the present invention, as described above, since temperature differences between batteries and cells in each battery can be minimized, the batteries are capable of exhibiting their maximum performance and can operate for their full service life.

Specifically, the four surfaces of each battery which is of a box shape are thermally insulated and the remaining two surfaces thereof are cooled, so that the heat can be discharged from the battery under better temperature control.

The two surfaces of the battery which are cooled are longitudinal or larger side surfaces thereof. This allows the cells of the battery to be cooled under equal conditions.

Inasmuch as batteries are surrounded by thermally insulating members, the batteries can be uniformly controlled for temperature.

The battery box according to the present invention has air discharge passages between its side walls and thermally insulating members. Because it is not necessary to provide any special air discharge passages on the lid or in the vicinity of the lid, the battery box is not complex in structure.

The bottom plate of the box assembly of the battery box has slits for applying air introduced therethrough to sides of the batteries in the battery box. This arrangement permits the batteries to be cooled under uniform conditions. Since the slits are positioned so as to be open toward the larger side surfaces of the batteries, the cells in each of the batteries can be uniformly cooled without temperature differences.

Furthermore, the runners of each of the fan structures are coupled by coupling means and are simultaneously rotated by the single rotary actuator for introducing cooling air into the battery box. As a result, the battery box is simple in construction, and lighter than a battery box in which the runners are associated with respective rotary actuators. The battery box can also be easily inspected and serviced for maintenance and manufactured inexpensively.

Although certain preferred embodiments of the present invention have been shown and described in detail, it should be understood that various changes and modifications may be made therein without departing from the scope of the appended claims.

What is claimed is:

1. A temperature control structure for controlling the temperatures of batteries, comprising:

a casing;

a plurality of batteries housed in said casing, each of said batteries being of a box shape having six surfaces;

thermally insulating members covering four of said six surfaces of each of said batteries and leaving two uninsulated surfaces;

air passages defined in said casings, the two uninsulated surfaces of each of said batteries being exposed to said air passages; and means for forcibly applying cooling air through said air passages to the two uninsulated surfaces of each of said batteries.

2. A temperature control structure according to claim 1, wherein each of said batteries is in the form of a rectangular parallelepiped, said two uninsulated surfaces comprising wider side surfaces of each of said batteries.

3. A battery box comprising:

a casing;

at least one box-shaped battery housed in said casing;

air passages defined in said casing along side surfaces of said battery; and thermally insulating members disposed in said casing out of said air passages in covering relation to surfaces of said battery other than said side surfaces.

4. A battery box according to claim 3, wherein said box-shaped battery is elongate and two of said surfaces extend perpendicularly to a longitudinal direction of said battery, and wherein one of the thermally insulating members disposed in covering relation to said two of the surfaces is spaced from a side wall of said casing, thereby defining an air discharge passage between said side wall of the casing and said one of the thermally insulating members.

5. A battery box according to claim 3, wherein said casing includes a bottom plate having a plurality of slits defined therein for applying cooling air introduced therethrough to said side surfaces of said box-shaped batteries.

6. A battery box according to claim 5, wherein each of said batteries is in the form of a rectangular parallelepiped, said slits being open toward wider side surfaces of the batteries.

7. A battery box according to claim 5, further comprising:

an array of runners disposed on one side of said casing;

coupling means for coaxially coupling said runners with each other; and a single rotary actuator coupled to one of said runners for rotating said runners in unison with each other.

8. A battery box according to claim 7, wherein said single rotary actuator is coupled to said one of the runners at one end of said array.

9. A battery box according to claim 7, wherein said array of runners comprises three runners coaxially coupled to each other by said coupling means.

10. A battery box according to claim 8, wherein said array of runners comprises three runners coaxially coupled to each other by said coupling means.

11. A battery box according to claim 7, wherein said coupling means comprises a plurality of bushings mounted on said runners, a plurality of joints fitted respectively in said bushings, and a plurality of drive shafts each fitted in the joints in the bushings which are mounted on adjacent two of said runners.

12. A battery box according to claim 8, wherein said coupling means comprises a plurality of bushings mounted on said runners, a plurality of joints fitted respectively in said bushings, and a plurality of drive shafts each fitted in the joints in the bushings which are mounted on adjacent two of said runners.

13. A battery box according to claim 9, wherein said coupling means comprises a plurality of bushings mounted on said runners, a plurality of joints fitted respectively in said bushings, and a plurality of drive shafts each fitted in the joints in the bushings which are mounted on adjacent two of said runners.

14. A temperature control structure for controlling the temperatures of batteries for propelling an electric vehicle, comprising:

a casing having a bottom plate;

a plurality of batteries housed in said casing, each of said batteries being of box shape having six surfaces;

at least one air duct mounted on a lower surface of said bottom plate of the casing for applying cooling air to two parallel side surfaces of said six surfaces of each of said batteries and a support mounted on said casing and supporting at least the bottom plate of the casing, said support having a hollow structure serving as a duct for applying cooling air to the side surfaces of said batteries.

15. A temperature control structure according to claim 14, wherein said support has a lower surface which is lower than a lower surface of said air duct.

16. A temperature control structure according to claim 14, wherein a plurality of parallel air ducts are mounted on the lower surface of said casing and mechanically coupled to each other.

17. A temperature control structure according to claim 16, wherein each of said air ducts is integrally molded of synthetic resin.

18. A temperature control structure according to claim 14, wherein each of said air ducts has at least one notch defined therein for allowing the air duct to be deformed when subjected to external forces.

19. A temperature control structure for controlling the temperatures of a plurality of batteries in an electric vehicle, each of which batteries is box-shaped and has two parallel side surfaces perpendicular to the cells in the battery, comprising:

a casing having a bottom plate for receiving the plurality of batteries; and at least one air duct mounted on a lower surface of said bottom plate of the casing for applying cooling air only to the two parallel side surfaces of each of said batteries.

20. A temperature control structure according to claim 19, further comprising insulating members covering each battery on all surfaces except the two parallel side surfaces.

21. A temperature control structure according to claim 19, wherein said bottom plate of the casing and each said air duct have mating elongated slots in registry with spaces along the two parallel side surfaces of each battery.

22. A temperature control structure according to claim 21, wherein a plurality of said air ducts are mounted in parallel on the lower surface of said casing.

23. A temperature control structure according to claim 21, wherein each said air duct extends longitudinally and has at least two said elongated slots spaced longitudinally.

24. A temperature control structure according to claim 23, wherein each of said air ducts includes means for causing substantially equal cooling air flow to each said elongated slot.

25. A temperature control structure according to claim 21, wherein means are provided surrounding each said elongated slot for inhibiting air flow escaping from between said bottom plate and each said air duct.

26. A temperature control device structure according to claim 22, wherein an array of runners are disposed along inlet ends of said plurality of air ducts for supplying cooling air to said air ducts, coupling means for coupling said runners to each other, and a single rotary actuator connected to at least one of said runners for rotating the runners.

27. A temperature control structure according to claim 1, wherein said casing includes a bottom plate having a plurality of slits defined therein for applying cooling air introduced therethrough to side surfaces of said box-shaped batteries.

28. A temperature control structure according to claim 27, wherein each of said batteries is in the form of a rectangular parallelepiped, said slits being open toward wider side surfaces of the batteries.

29. A temperature control structure according to claim 27, further comprising:

an array of runners disposed on one side of said casing;

coupling means for coaxially coupling said runners with each other; and a single rotary actuator coupled to one of said runners for rotating said runners in unison with each other.

30. A temperature control structure according to claim 29 wherein said single rotary actuator is coupled to said one of the runners at one end of said array.

31. A temperature control structure according to claim 29, wherein said array of runners comprises three runners coaxially coupled to each other by said coupling means.

32. A temperature control structure according to claim 30, wherein said array of runners comprises three runners coaxially coupled to each other by said coupling means.

33. A temperature control structure according to claim 29, wherein said coupling means comprises a plurality of bushings mounted on said runners, a plurality of joints fitted respectively in said bushings, and a plurality of drive shafts each fitted in the joints in the bushing which are mounted on adjacent two of said runners.

34. A temperature control structure according to claim 30, wherein said coupling means comprises a plurality of bushings mounted on said runners, a plurality of joints fitted respectively in said bushings, and a plurality of drive shafts each fitted in the joints in the bushings which are mounted on adjacent two of said runners.

35. A temperature control structure according to claim 31, wherein said coupling means comprises a plurality of bushings mounted on said runners, a plurality of joints fitted respectively in said bushings, and a plurality of drive shafts each fitted in the joints in the bushings which are mounted on adjacent two of said runners.

* * * * *